United States Patent
Grieve et al.

(10) Patent No.: US 10,445,414 B1
(45) Date of Patent: Oct. 15, 2019

(54) SYSTEMS AND METHODS FOR COLLABORATIVE DOCUMENT EDITING

(71) Applicant: Google Inc., Mountain View, CA (US)

(72) Inventors: Andrew Alexander Grieve, Waterloo (CA); Mohammad Hossain Sheikh Attar, Richmond Hill (CA)

(73) Assignee: GOOGLE LLC, Mountain View, CA (US)

(*) Notice: Subject to any disclaimer, the term of this patent is extended or adjusted under 35 U.S.C. 154(b) by 1012 days.

(21) Appl. No.: 14/286,564

(22) Filed: May 23, 2014

Related U.S. Application Data

(63) Continuation of application No. 13/297,762, filed on Nov. 16, 2011, now Pat. No. 8,738,706.

(51) Int. Cl.
*G06F 17/22* (2006.01)
*G06F 17/24* (2006.01)

(52) U.S. Cl.
CPC ...... *G06F 17/2288* (2013.01); *G06F 17/2264* (2013.01); *G06F 17/24* (2013.01)

(58) Field of Classification Search
CPC ............... G06F 17/2247; G06F 17/227; G06F 17/2264; G06F 17/2288; G06F 17/24
See application file for complete search history.

(56) References Cited

U.S. PATENT DOCUMENTS

| | | |
|---|---|---|
| 5,528,743 A | 6/1996 | Tou et al. |
| 5,758,358 A | 5/1998 | Ebbo |
| 5,761,669 A | 6/1998 | Montague et al. |
| 5,793,966 A | 8/1998 | Amstein et al. |
| 5,895,476 A | 4/1999 | Orr et al. |
| 5,930,813 A | 7/1999 | Padgett et al. |
| 6,006,239 A | 12/1999 | Bhansali et al. |
| 6,023,714 A * | 2/2000 | Hill ............ G06F 17/211 715/235 |
| 6,049,664 A | 4/2000 | Dale et al. |

(Continued)

OTHER PUBLICATIONS

"Simultaneously edit a presentation with other authors," by Microsoft™ Office: Mac, published Nov. 11, 2010, pp. 1-4.

(Continued)

*Primary Examiner* — Thu V Huynh
(74) *Attorney, Agent, or Firm* — Lowenstein Sandler LLP

(57) ABSTRACT

A collaborative development service manages a document that can be shared among multiple users. If multiple users are editing the document, the edits may need to have operational transformation rules applied thereon. The collaborative development service provides operational transformation rules to users of mobile devices that do not have copies of the operational transformation rules stored on their devices. When a change to the document is received by the collaborative development service, it is determined that a first user device has operational transformation capability. In response to determining that the first user device has operational transformation capability, the change is transmitted to the first user. The collaborative development service determines that a second user device does not have operational transformation capability and applies an operational transformation to the change to generate a transformed change. The transformed change is transmitted to the second user device.

20 Claims, 11 Drawing Sheets

(56) References Cited

U.S. PATENT DOCUMENTS

| | | |
|---|---|---|
| 6,169,999 B1 | 1/2001 | Kanno |
| 6,243,706 B1 | 6/2001 | Moreau et al. |
| 6,275,223 B1 | 8/2001 | Hughes |
| 6,327,584 B1 | 12/2001 | Xian et al. |
| 6,341,305 B2 | 1/2002 | Wolfe |
| 6,377,354 B1 | 4/2002 | Nguyen et al. |
| 6,418,441 B1 | 7/2002 | Call |
| 6,501,779 B1 | 12/2002 | McLaughlin et al. |
| 6,512,531 B1 | 1/2003 | Gartland |
| 6,589,291 B1* | 7/2003 | Boag ............... G06F 17/2247 707/E17.121 |
| 6,662,210 B1 | 12/2003 | Carleton et al. |
| 6,717,593 B1 | 4/2004 | Jennings |
| 6,879,997 B1 | 4/2005 | Ketola et al. |
| 6,972,748 B1 | 12/2005 | Lang |
| 6,983,316 B1 | 1/2006 | Milne et al. |
| 6,983,416 B1 | 1/2006 | Bae et al. |
| 7,009,626 B2 | 3/2006 | Anwar |
| 7,031,954 B1 | 4/2006 | Kirsch |
| 7,035,910 B1 | 4/2006 | Dutta et al. |
| 7,039,643 B2 | 5/2006 | Sena et al. |
| 7,107,357 B2 | 9/2006 | Cooper |
| 7,231,597 B1 | 6/2007 | Braun et al. |
| 7,287,094 B2* | 10/2007 | Mogul ............... H04L 67/2828 709/246 |
| 7,299,411 B2* | 11/2007 | Blair ............... G06F 17/211 348/E7.073 |
| 7,437,421 B2 | 10/2008 | Bhogal et al. |
| 7,478,330 B1 | 1/2009 | Branson et al. |
| 7,487,448 B2 | 2/2009 | Emerson et al. |
| 7,491,399 B2 | 2/2009 | Vakharia |
| 7,519,630 B2 | 4/2009 | Brown et al. |
| 7,519,953 B2 | 4/2009 | Reissman et al. |
| 7,529,778 B1 | 5/2009 | Dewey et al. |
| 7,529,784 B2 | 5/2009 | Kavuri et al. |
| 7,624,145 B2 | 11/2009 | Junuzovic et al. |
| 7,656,543 B2 | 2/2010 | Atkins |
| 7,665,068 B2 | 2/2010 | Neumann et al. |
| 7,680,932 B2 | 3/2010 | Defaix et al. |
| 7,698,379 B2 | 4/2010 | Dutta et al. |
| 7,712,016 B2 | 5/2010 | Jones et al. |
| 7,774,703 B2 | 8/2010 | Junuzovic et al. |
| 7,788,647 B2 | 8/2010 | Martin et al. |
| 7,792,788 B2 | 9/2010 | Melmon et al. |
| 7,836,148 B2 | 11/2010 | Popp et al. |
| 7,890,928 B2 | 2/2011 | Patrudu |
| 7,904,515 B2 | 3/2011 | Ambati et al. |
| 7,917,554 B2 | 3/2011 | Hull et al. |
| 7,920,894 B2 | 4/2011 | Wyler |
| 7,950,004 B2 | 5/2011 | Vieira et al. |
| 7,953,696 B2 | 5/2011 | Davis et al. |
| 7,958,448 B2 | 6/2011 | Fattic, II et al. |
| 7,983,416 B2 | 7/2011 | Takashima et al. |
| 7,984,426 B2 | 7/2011 | Loff |
| 8,001,606 B1 | 8/2011 | Spertus |
| 8,005,858 B1 | 8/2011 | Lynch et al. |
| 8,019,780 B1 | 9/2011 | Pinkerton et al. |
| 8,020,001 B2 | 9/2011 | Lundblade et al. |
| 8,044,961 B2 | 10/2011 | Opstad et al. |
| 8,065,604 B2 | 11/2011 | Blankinship |
| 8,073,812 B2 | 12/2011 | Curtis |
| 8,234,620 B1 | 7/2012 | Bychkov et al. |
| 8,321,437 B2 | 11/2012 | Lim |
| 8,327,127 B2 | 12/2012 | Suryanarayana et al. |
| 8,327,812 B2 | 12/2012 | Vuk |
| 8,395,733 B2 | 3/2013 | Ataka et al. |
| 8,516,446 B2 | 8/2013 | Williams et al. |
| 9,122,650 B1* | 9/2015 | Colton ............... G06F 17/20 |
| 2002/0032701 A1 | 3/2002 | Gao et al. |
| 2002/0035580 A1 | 3/2002 | Tanabe |
| 2002/0133492 A1 | 9/2002 | Goldstein et al. |
| 2002/0174085 A1 | 11/2002 | Nelson et al. |
| 2003/0037076 A1 | 2/2003 | Bravery et al. |
| 2003/0037303 A1 | 2/2003 | Bodlaender et al. |
| 2003/0055862 A1* | 3/2003 | Bhat ............... G06F 9/4843 718/101 |
| 2003/0061349 A1 | 3/2003 | Lo et al. |
| 2003/0084078 A1 | 5/2003 | Torii et al. |
| 2003/0115268 A1 | 6/2003 | Esposito |
| 2003/0179230 A1 | 9/2003 | Seidman |
| 2004/0015781 A1 | 1/2004 | Brown et al. |
| 2004/0030982 A1* | 2/2004 | Aldridge ............... H04L 1/1887 714/776 |
| 2004/0044965 A1 | 3/2004 | Toyama et al. |
| 2004/0085354 A1 | 5/2004 | Massand |
| 2004/0088374 A1 | 5/2004 | Webb et al. |
| 2004/0088653 A1 | 5/2004 | Bell et al. |
| 2004/0133444 A1 | 7/2004 | Defaix et al. |
| 2004/0215672 A1 | 10/2004 | Pfitzner |
| 2004/0215825 A1 | 10/2004 | Pfitzner |
| 2004/0215826 A1 | 10/2004 | Pfitzner |
| 2004/0216090 A1 | 10/2004 | Kaler et al. |
| 2005/0066307 A1 | 3/2005 | Patel et al. |
| 2005/0071818 A1 | 3/2005 | Reissman et al. |
| 2005/0091291 A1 | 4/2005 | Kaler et al. |
| 2005/0097508 A1 | 5/2005 | Jacovi et al. |
| 2005/0125461 A1 | 6/2005 | Filz |
| 2005/0131887 A1 | 6/2005 | Rohrabaugh et al. |
| 2005/0132333 A1 | 6/2005 | Neumann et al. |
| 2005/0185636 A1 | 8/2005 | Bucher |
| 2005/0200896 A1 | 9/2005 | Narusawa et al. |
| 2005/0234943 A1 | 10/2005 | Clarke |
| 2006/0031751 A1 | 2/2006 | Ehud |
| 2006/0053196 A1 | 3/2006 | Spataro et al. |
| 2006/0075332 A1 | 4/2006 | Fairweather et al. |
| 2006/0101071 A1 | 5/2006 | Henderson |
| 2006/0149831 A1 | 7/2006 | Dutta et al. |
| 2006/0200755 A1 | 9/2006 | Melmon et al. |
| 2006/0230344 A1 | 10/2006 | Jennings et al. |
| 2006/0248121 A1 | 11/2006 | Cacenco et al. |
| 2007/0033654 A1 | 2/2007 | Wilson |
| 2007/0061714 A1 | 3/2007 | Stuple et al. |
| 2007/0070066 A1 | 3/2007 | Bakhash |
| 2007/0073899 A1 | 3/2007 | Judge et al. |
| 2007/0075916 A1 | 4/2007 | Bump et al. |
| 2007/0094601 A1 | 4/2007 | Greenberg et al. |
| 2007/0186157 A1 | 8/2007 | Walker et al. |
| 2007/0208992 A1 | 9/2007 | Koren |
| 2007/0220068 A1 | 9/2007 | Thompson et al. |
| 2007/0220342 A1 | 9/2007 | Vieira et al. |
| 2007/0233811 A1 | 10/2007 | Rochelle et al. |
| 2007/0239695 A1 | 10/2007 | Chakra et al. |
| 2007/0288637 A1 | 12/2007 | Layton et al. |
| 2007/0299857 A1 | 12/2007 | Gwozdz et al. |
| 2008/0028302 A1 | 1/2008 | Meschkat |
| 2008/0040659 A1 | 2/2008 | Doyle |
| 2008/0052690 A1 | 2/2008 | Bharadwaj |
| 2008/0059539 A1 | 3/2008 | Chin et al. |
| 2008/0082604 A1 | 4/2008 | Mansour et al. |
| 2008/0083031 A1 | 4/2008 | Meijer et al. |
| 2008/0126943 A1 | 5/2008 | Parasnis et al. |
| 2008/0133563 A1 | 6/2008 | Hironiwa |
| 2008/0178073 A1 | 7/2008 | Gao et al. |
| 2008/0215450 A1 | 9/2008 | Gates et al. |
| 2008/0320442 A1 | 12/2008 | Lyon-Smith |
| 2009/0052804 A1 | 2/2009 | Lewis |
| 2009/0064311 A1 | 3/2009 | Clark et al. |
| 2009/0076916 A1 | 3/2009 | Kim et al. |
| 2009/0112990 A1 | 4/2009 | Campbell et al. |
| 2009/0177703 A1 | 7/2009 | Cuneo et al. |
| 2009/0187894 A1 | 7/2009 | Bell et al. |
| 2009/0192845 A1 | 7/2009 | Gudipaty et al. |
| 2009/0235181 A1* | 9/2009 | Saliba ............... G06Q 10/10 715/753 |
| 2009/0328063 A1 | 12/2009 | Corvera et al. |
| 2010/0030578 A1 | 2/2010 | Siddique et al. |
| 2010/0042974 A1 | 2/2010 | Gutz et al. |
| 2010/0058468 A1 | 3/2010 | Green et al. |
| 2010/0083096 A1 | 4/2010 | Dupuis-Latour et al. |
| 2010/0153948 A1 | 6/2010 | Schreiber et al. |
| 2010/0211772 A1 | 8/2010 | Johansson et al. |
| 2010/0218099 A1 | 8/2010 | van Melle et al. |
| 2010/0235763 A1 | 9/2010 | Massand |

(56) References Cited

U.S. PATENT DOCUMENTS

| | | | |
|---|---|---|---|
| 2010/0241749 A1 | 9/2010 | Rasmussen et al. | |
| 2010/0245256 A1 | 9/2010 | Estrada et al. | |
| 2010/0251122 A1 | 9/2010 | Lee et al. | |
| 2010/0257451 A1* | 10/2010 | Halevi | G06F 15/16 715/733 |
| 2010/0257517 A1 | 10/2010 | Sriram et al. | |
| 2010/0333116 A1 | 12/2010 | Prahlad et al. | |
| 2011/0016409 A1* | 1/2011 | Grosz | G06F 17/3028 715/753 |
| 2011/0066957 A1 | 3/2011 | Prats et al. | |
| 2011/0082684 A1 | 4/2011 | Soricut et al. | |
| 2011/0085211 A1 | 4/2011 | King et al. | |
| 2011/0178981 A1 | 7/2011 | Bowen et al. | |
| 2011/0239195 A1 | 9/2011 | Lin et al. | |
| 2011/0252339 A1* | 10/2011 | Lemonik | G06F 17/2288 715/753 |
| 2011/0302237 A1* | 12/2011 | Knight | G06Q 10/101 709/203 |
| 2011/0313820 A1 | 12/2011 | Biewald et al. | |
| 2012/0023129 A1 | 1/2012 | Vedula et al. | |
| 2012/0072819 A1 | 3/2012 | Lindner et al. | |
| 2012/0096516 A1 | 4/2012 | Sobel et al. | |
| 2012/0110445 A1 | 5/2012 | Greenspan et al. | |
| 2012/0246616 A1 | 9/2012 | Frontiero et al. | |
| 2012/0331373 A1 | 12/2012 | Lindner et al. | |
| 2013/0097659 A1 | 4/2013 | Das et al. | |
| 2013/0198606 A1 | 8/2013 | Farrell et al. | |
| 2013/0218845 A1 | 8/2013 | Kleppner et al. | |
| 2013/0246901 A1* | 9/2013 | Massand | G06F 17/24 715/229 |
| 2014/0006919 A1* | 1/2014 | He | G06F 17/241 715/230 |
| 2015/0199307 A1* | 7/2015 | Zhang | G06F 17/30873 715/208 |

OTHER PUBLICATIONS

"Using Adobe Buzzword", 2008, pp. 1-35.
Jun. 10, 2010, XP055027976,retrieved from the Internet May 23, 2012: https://groups.google.com/group/wave-protocol/browse_thread/threadl73608bf7a13f2385.
Bibi et al., "A Platform for Delivering Multimedia Presentations on Cultural Heritage," 2010 14th Panhellenic Conference on Informatics, pp. 175-179.
Brouwer et al., MathDox editor, Electronic Proceedings MathUI 2009, 2009, XP55028009, retrieved from the Internet May 23, 2012: <http://Www/>win.tue.nl/hansc/mde.pdf.
Cairns et al., "System and Method of Document Embedding in Collaborative Editors," unpublished U.S. Appl. No. 13/493,672, filed Jun. 11, 2012, 1-48.
Cairns, "System and Method of Secure Communication Between Multiple Child Frames," unpublished U.S. Appl. No. 13/493,798, filed Jun. 11, 2012, 1-47.
Cayenne-McCall, "Synchronous 3D Document Collaboration," Pace University, Department of Computer Sciene; Nov. 2008. (42 Pages).
Chevalier et al., Using Text Animated Transitions to Support Navigation in Document Histories, Proceedings of the 28th International Conference in Human Factors in Computing Systems, Apr. 10, 2010, 683-692.
Chitu,Footnotes in GoogleDocs, Oct. 17, 2008, XP055028085, retrieved from the Internet 5/24/2012: http://googlesystem.blogspot.com/2008/10/footnotes-in-google-docs.html.
Conner, Zoho 4 Everyone, 2008, downloaded from the internet http://techbus.safaribooksonline.com/print?xmlid=9780768687835/ch011ev1 sec1, Aug. 21, 2012, p. 1-17.
Danilatos, Riche Text Editor—Message dated Jun. 10, 2010 8:57am, Wave Protocol Group Discussion Forum.
Danilatos. Demonstration Doodad, with a few different variations of rendering and interactive behaviour,Dec. 5, 2010, 1-3, retrieved from the Internet May 24, 2012: http://code.google.com/p/wave-protocol/source/browse/srcJorg/waveprotocol/wave/client/editor/exampleslimg/MyDoodadjava.
Ellis et al., "Concurrency Control in Groupware Systems," ACM 1989, pp. 399-407.
Googlepedia: The Ulitimate Google REsource, Third Edition, 2008.
Grieve et al., "Systems and Methods for Collaborative Document Editing," unpublished U.S. Appl. No. 13/297,762, filed Nov. 16, 2011, pp. 1-49.
Hashemi, "Ambigity Resolution by Reording Rules in Text Containing Errors," Association for Computational Linguistics, 62(1):69-70 (2007).
Hearnden, Wave Editor & Document Renders. A talk by Dave Hearnden at teh Wave Summit captured in video on YouTube Nov. 12, 2010, retrieved from the Internet 5/23/2012: http:J/youtu.beiEuXApEullzc.
Hodel et al., "Supporting Collaborative Layouting in Word Processing," University of Zurich, Department of Inforamtics; Zurich, Switzerland, 2004 (18 page).
Holzer, "Google Docs 4 Everyone" http://www.scribd.com/doc/14119795/Google-Docs-4-Everyone Published Feb. 2009.
https://addons.mozilla.org/En-us/seamonkey/addon/gmail-smime/?src=search.
Huang et al., "A General Purpose Virtual Collaboration Room," Google 1999, pp. 1 -9.
Ignat et al., "CoDoc: Multi-mode Collaboration over Docuemtns," ETII Surich,Institute for Information Systems; Zurich, Switzerland, 2004 (15 pages).
International Search Report and Written Opinion issued in PCT/US2012/028279 dated Jun. 6, 2012.
Lemonik et al., "System and Method for Providing Data Management Services," unpublished U.S. Appl. No. 13/224,860, filed Sep. 2, 2011, pp. 1-88.
Lemonik et al., "System and Method for Providing Access to a Document Associated with a Third Party Software Application Via Interframe Communication," unpublished U.S. Appl. No. 13/224,769, filed Sep. 2, 2011, pp. 1-90.
Lemonik et al., "System and Method for Providing Real-Time Collaborative Document Editing Services," unpublished U.S. Appl. No. 13/224,573, filed Sep. 2, 2011, pp. 1-90.
Lemonik et al., "System and Method for Updating an Object Instance Based on Instructions Received from Multiple Devices," unpublished U.S. Appl. No. 13/282,636, filed Oct. 17, 2011, pp. 1-91.
Lemonik et al., "System and Method to Provide Collaborative Document Processing Services Via Interframe Communication," unpublished U.S. Appl. No. 13/224,663, filed Sep. 2, 2011, pp. 1-90.
Lemonik et al., System and Method for Using a Third-Party Add-On in a Collaborative Online Software Development Environment, unpublished U.S. Appl. No. 13/551,859, filed Jul. 18, 2012, pp. 1-103.
Mulvany, "What's Going on in Indexing," ACM 1997, pp. 10-15.
Munteaunu et al., "Collaborative Editing for Improved Usefulness and Usability of Transcript-Enhanced Webcasts," ACM 2008, pp. 373-382.
Nasir et al., "Collaborative Report Creation System for Industrial Use," Yamagata University, Graduate School of Science and Engineering; Yamagata, Japan 2009 (6 pages).
Nichols et al., High-Latency, Low-Bandwidth Windowing in the Jupiter Collaboration System, UIST '95. 8th Annual Symposium on User Interface Software and Technology. Proceedings of the ACM Symposium on User Interface SoftwareandTedmology,Nov. 14-17, 1995,111-120.
Pacull et al., "Duplex: A Distributed Collaborative Editing Environment in Large Scale," ACM 1994, pp. 165-173.
Peels et al., Document Architecture and Text Formatting, ACM Transactions on Office Information Systems, 3(4):347-369 (1985).
Pereira et al., Merging Electronic Document Redraws, unpublished U.S. Appl. No. 13/282,753, filed Oct. 27, 2011, pp. 1-30.
Pereira et al., Merging Electronic Document Redraws, unpublished U.S. Appl. No. 13/006,259, filed Jan. 13, 2011, pp. 1-30.
Shen et al., "Integrating Advanced Collaborative Capabilitites into Web-Based Word Processors," Nauyang Technological University, School of Computer Engineering, Singapore 2007 (8 pages).

(56) References Cited

OTHER PUBLICATIONS

Sun et al., "Operational Transformation in Real-Time Group Editors: Issues, Algorithms, and Achievements," 1998, ACM Conference on Computer-Supported Cooperative Work, pp. 1-10.
Unpublished U.S. Appl. No. 13/206,896, filed Aug. 10, 2011.
Unpublished U.S. Appl. No. 13/207,051, filed Aug. 10, 2011.
Unpublished U.S. Appl. No. 13/207,117, filed Aug. 10, 2011.
Wang et al. Google Wave Operational Transformation, Jul. 1, 2010, 1-6, retrieved from the Internet Feb. 14, 2012: http://1 wave-protocol.googlecode.comfhg/Whitepapers/operational-transform/operational-transform.html.
Wikipeda, "Operational Transformation," http://en.wikipedia.org/wiki/Operation_transformation, pp. 1-14.
Sun, "Undo as Concurrent Inverse in Group Editors," 2002, ACM Transactions on Computer-Human interaction, vol. 9 No. 4, Dec. 2002, pp. 309-361.
Ding, "The Dependency Management Framework: A Case Study of the ION CubeSat", 2006 IEEE; 10 pages; (http://ieeexplore.ieee.org/stamp/stamp.jsp?tp=&arnumber=164 7725>.
Guo, "A Coordination Framework for Software Component Based Development", 2006 IEEE; 8 pages; <http://ieeexplore.ieee.orq/stamp/stamp.isp?tp=&arnumber=4020089>.
Martin, et al., "Scalable XML Collaborative Editing With Undo," 2010, OTM 2010, Part I, LNCS 6426, pp. 507-514, 2010.
Coulson, "A generic Component Model for Building Systems Software", ACM Transactions on Computer Systems, 26 (1), Article 1 (Feb. 2008), 42 pages.
Ellis et al., "Groupware Some Issues and Experiences", Communications of the Association for Computing Machinery, 34(1), Jan. 1991, pp. 38-58.
Ignat et al., "Awareness of Concurrent Changes in Distributed Software Development," Nancy- Universite, France, 2008 (9 pages).
Ommering, "Building Product Populations with Software Components," 2002 ACM; pp. 255-265; <http://dlacm.orq/citation.cfm?id=581373>.
Prakash, "A Framework for Undoing Actions in Collaborative Systems", ACM Transactions on Computer-Human Interaction, vol. 1, No. 4, Dec. 1994, renumbered pp. 1-36.
Raman, "Cloud Computing and Equal Access for All," Google Inc., 2008 (4 pages).
Shen et al., "Flexible Merging for Asynchronous Collaborative Systems," Griffith University, School of Computing an Information Technology, Brisbane, Australia, 2002 (18 pages).
Sun, "Undo Any Operation at Any Time in Group Editors," 2000 ACM Conference on Computer-Supported cooperative Work, 2000, pp. 199-200.
Szyperski, Component Technology—What, Where, and How; 2003 IEEE; pp. 684-693; <http://dl.acm.orq/citation.cfm?d=776916>.
Yacoub, Scenario-Based Reliability Analysis of Component-Based Software; 1999 IEEE; 10 pages; <http://ieeexplore.ieee.orq/stamp/stamp.isp?tp=&arnumber=809307>.
Citro, Sandy, "Conflict Management for Real-Time Collaborative Editing in Mobile Replicated Architectures," 2007, Australian Computer Society, Inc., Thirteenth Australian Computer Science Conference (ACSC2007), pp. 115-124.
DeJean, David, "Online office apps get real: Google Docs vs. ThinkFree vs. Zoho, Web-based suites have become real challengers to desktop applications," Jul. 16, 2008, Computerworld [online]. Retrieved from the Internet: <URL: http://www.computerworld.com/s/article/print/9108799/Onfine office_apps_get_real_Google_Docs_vs_ThinkFree_vs_Zoho> (7 pages).
Olav Junker Kjaer, "Timing and Synchronization in JavaScript", Dev. Opera, Sections: "The Basics", "Event Queing", "Long Running Scripts" and "Advice on Timing", Feb. 27, 2007, downloaded from URL: htt//dev.opera.com/articles/view/timing-and-synchronization-iniavascript/, pp. 1-9.
PCT International Search Report & Written Opinion of the International Searching Authority corresponding to PCT Application No. PCT/US2011/001417 dated Aug. 11, 2011 (7 pages).
Quinn, Laura S., "Comparing Online vs. Traditional Office Software, Will desktop or online office software fit your non-profit needs best?" May 21, 2010, courtesy of Idealware, TechSoup.org [online]. Retrieved from the Internet URL:http://www.techsoup.org/learningcenter/software/page11852.cfm (4 pages).
Tyson, Herb, "Microsoft Word 2007 Bible," 2007, 112-115, 467, 523-525, 798.
Wikipedia, the free encyclopedia, "Model-View-Controller," last modified on Nov. 16, 2010 [online]. Retrieved from the Internet: URL:http://en.wikipedia.org/wiki/Model%E2%80%93view%E2%80%93controller (10 pages).

* cited by examiner

SYSTEMS AND METHODS FOR COLLABORATIVE DOCUMENT EDITING

CROSS REFERENCE TO RELATED APPLICATIONS

This application is a continuation of U.S. patent application Ser. No. 13/297,762, filed on Nov. 16, 2011; which is related to U.S. patent application Ser. No. 13/224,479 filed Sep. 2, 2011; U.S. patent application Ser. No. 13/224,530 filed Sep. 2, 2011; U.S. patent application Ser. No. 13/224,573 filed Sep. 2, 2011; U.S. patent application Ser. No. 13/224,663 filed Sep. 2, 2011; U.S. patent application Ser. No. 13/224,769 filed Sep. 2, 2011; U.S. patent application Ser. No. 13/224,860 filed Sep. 2, 2011; U.S. patent application Ser. No. 13/551,772 filed Jul. 18, 2012; and U.S. patent application Ser. No. 13/551,859 filed Jul. 18, 2012, all of which are hereby incorporated herein by reference in their entirety.

TECHNICAL FIELD

This specification relates generally to systems, methods, and apparatus for proving collaborative document editing services to multiple users and more particularly to systems, methods, and apparatus for providing collaborative document editing services to use is of mobile devices.

BACKGROUND

Multiple users in remote locations may collaboratively edit a document. Collaboration by two or more users can be challenging when one or more of the users are accessing the document using a mobile device. Capabilities of mobile devices are limited in comparison to non-mobile devices. Further, mobile devices may not have access to the latest version of the document. Additionally, mobile devices may not store certain portions of software required for collaborating document editing, and as a result, mobile devices may not be able to properly apply changes to the document for purposes of collaborative editing.

SUMMARY

In accordance with an embodiment, a server receives a change to a document. The server determines that a first user device has operational transformation capability. In response to determining that the first user device has operational transformation capability, the change is transmitted to the first user device. The server determines that a second user device does not have operational transformation capability. In response to determining that the second user does not have operational transformation capability, an operational transformation rule is applied to the change to generate a transformed change. The server transmits the transformed, change to the second user device.

In one embodiment, at the server, an automatic request for the document, by the first user device, is received.

In one embodiment, the change to the document originates at the second user device.

In one embodiment, the operational transformation rule comprises a list of operational transformations.

In one embodiment, the change to the document is received at the server as a batch request. In one embodiment, the batch request comprises an extensible markup language hypertext transfer protocol request. In one embodiment, the extensible markup language hypertext transfer protocol request comprises one of: a force save request, one or more optimistic save requests, or a refresh type.

In one embodiment, a first version of the document is transmitted along with transmitting the transformed change to the second user device.

In one embodiment, the second user device is a mobile user device.

These and other advantages of the present disclosure will be apparent to those of ordinary skill in the art by reference to the following Detailed Description and the accompanying drawings.

BRIEF DESCRIPTION OF THE DRAWINGS

FIG. 3 is a flowchart depicting a method of providing collaborative document editing services in accordance with an embodiment;

DETAILED DESCRIPTION

Figure 1:
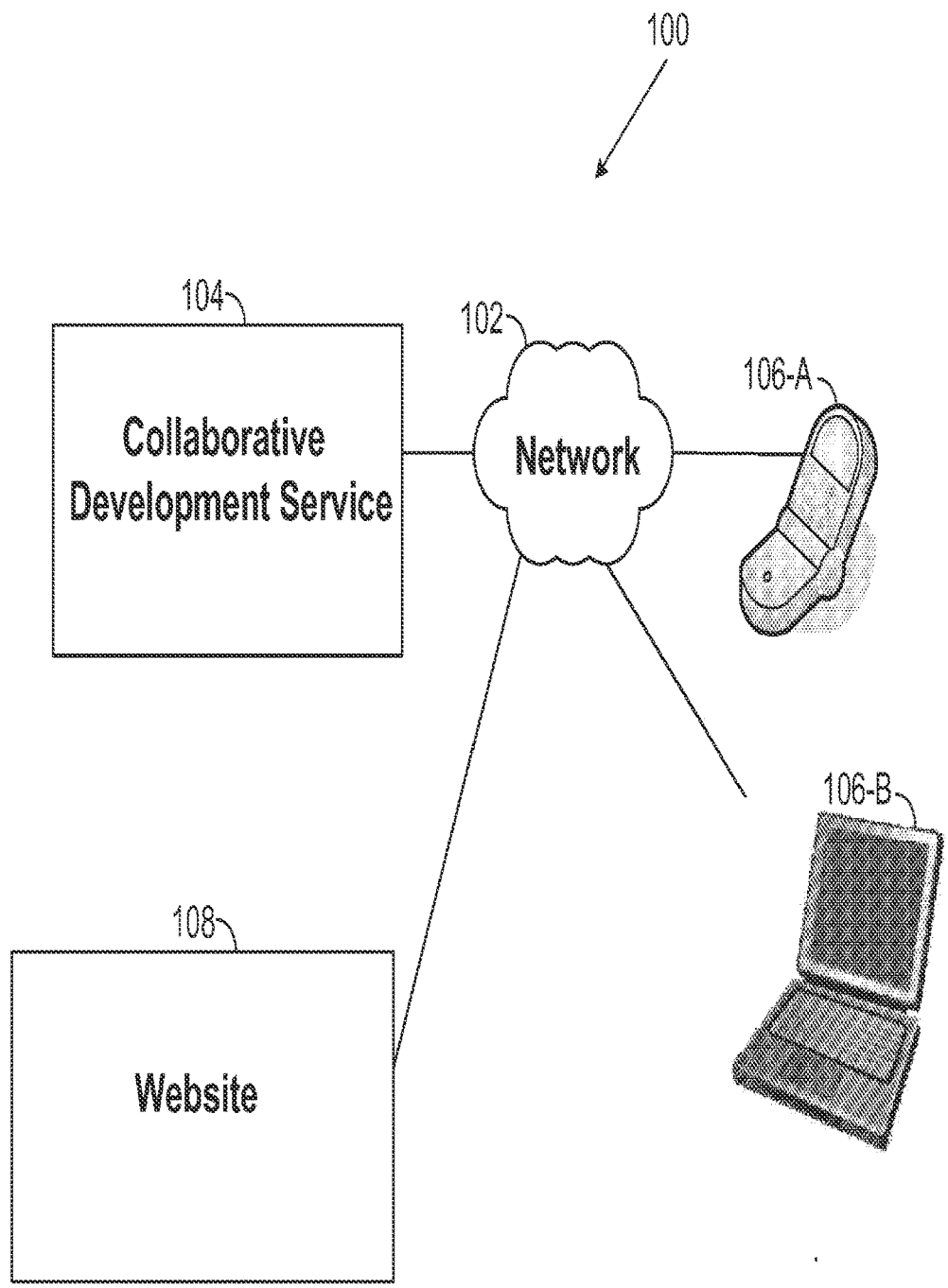
FIG. 1 shows a communication system that may be used to provide collaborative document editing services in accordance with an embodiment.

FIG. 1 shows a communication system 100 that may be used to provide collaborative document editing services in accordance with an embodiment. Communication system 100 includes a network 102, a collaborative development service 104, and user devices 106-A, 106-B, etc. Communication system 100 may include more or fewer than two user devices.

In the exemplary embodiment of FIG. 1, network 102 is the Internet. In other embodiments, network 102 may include one or more of a number of different types of networks, such as, for example, an intranet, a local area network (LAN), a wide area network (WAN), a wireless network, a Fibre Channel based storage area network (SAN), or Ethernet. Other networks may be used. Alternatively, network 105 may include a combination of different types of networks.

In one embodiment, collaborative development service 104 may include a server and therefore, the terms collaborative development service 104 and server are herein used interchangeably. In one embodiment, collaborative development service 104 may host a website 108 that can be accessed by user devices 106-A and 106-B. In an alternative embodiment, website 108 may be hosted by a different server. Collaborative development service 104 via website 108 provides user devices 106-A and 106-B access to various webpages. In one embodiment, website 108 provides to user devices 106-A and 106-B access to one or more webpages displaying a document 308, shown in FIGS. 4A, 4B and 4C. Documents may be related to a variety of different content types, including, without limitation, text documents, spreadsheets, drawings, photographs, images, video files, music or audio files, designs, etc. or a combination of these content types. User devices 106-A and 106-B may access a World Wide Web page on website 108 that may be viewed using a conventional Web browser, for example. In one embodiment, multiple users employing respective user devices 106-A and 106-B may access website 108 to collaboratively edit a document.

In certain embodiments, collaborative document editing services are provided to multiple users of multiple user devices by use of operational transformations. Specifically, operational transformations are applied to changes to a document that are received from various user devices to ensure consistency in the visual representations of the document displayed on the various devices. Operational transformations are achieved by applying one or more operational transformation rules, which are stored at collaborative development service 104. In one embodiment, the operational transformation rules comprise a list of operational transformations.

Some user devices store operational transformation rules and therefore have operational transformation capability. For example, a personal computer (PC) may store operational transformation rules and have operational transformation capability. Other user devices do not store operational transformation rules and consequently do not have operational transformation capability. For example, a mobile device such as a cellphone, due to memory, processing of other physical limitations, may not have operational transformation capability.

User devices 106-A and 106-B may each be any device that enables a user to view website 108 via network 102. User devices 106-A and 106-B may each be connected to network 102 through a direct (wired) link, or in the illustrated embodiment, wirelessly. User devices 106-A and 106-B may each have a display screen (not shown) for displaying information. In the illustrative embodiment, user device 106-B is a device having operational transformation capability, such as a personal computer, a laptop computer a workstation, a mainframe computer, etc. In the illustrated embodiment, user device 106-A is a device that does not have operational transformation capability; for example, user device 106-A may be a mobile communication device such as a wireless phone, a personal digital assistant, cellular device, a laptop computer, a netbook, a tablet device, a book reader etc. Other devices may be used.

Figure 2A:
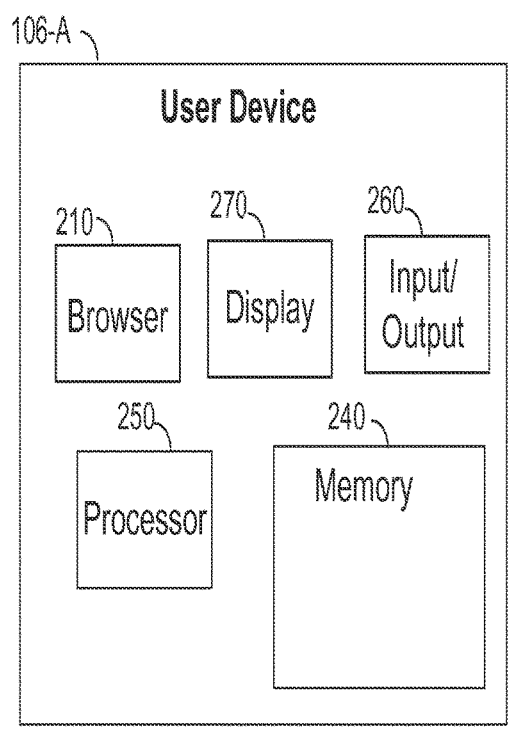
FIG. 2A shows functional components of a first exemplary user device in accordance with an embodiment.

FIG. 2A shows functional components of a first exemplary user device in accordance with an embodiment. In the exemplary embodiment of FIG. 1, user device 106-A is a mobile device. For example, user device 106-A may be a cellular phone. User device 106-A includes a web browser 210, a display 270, an input/output 260, a processor 250 and a memory 240. Web browser 220 may be a conventional web browser used to access World Wide Web sites via the Internet, for example. Display 270 displays, documents, text, images, software applications, webpages, and other information. For example, all or a portion of document 308 may be displayed on display 270.

Figure 2B:
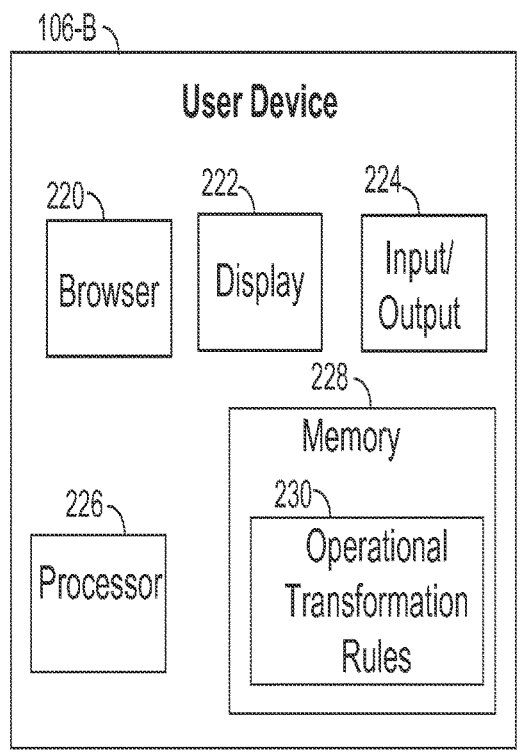
FIG. 2B shows functional components of a second exemplary user device in accordance with an embodiment.

FIG. 2B shows functional components of a second exemplary user device in accordance with an embodiment. In the exemplary embodiment of FIG. 1, user device 106-B is a device (e.g. a laptop) capable of storing operational transformation rules 230. User device 106-B includes a web browser 220, a display 222, an input/output 224, a processor 226 and a memory 228. Memory 228 stores a set of operational transformation rules 230. Web browser 220 may be a conventional web browser used to access World Wide Web sites via the Internet, for example. Display 222 displays, documents, text, images, software applications, webpages, and other information. For example, all or a portion of document 308 may be displayed on display 222.

Figure 3:
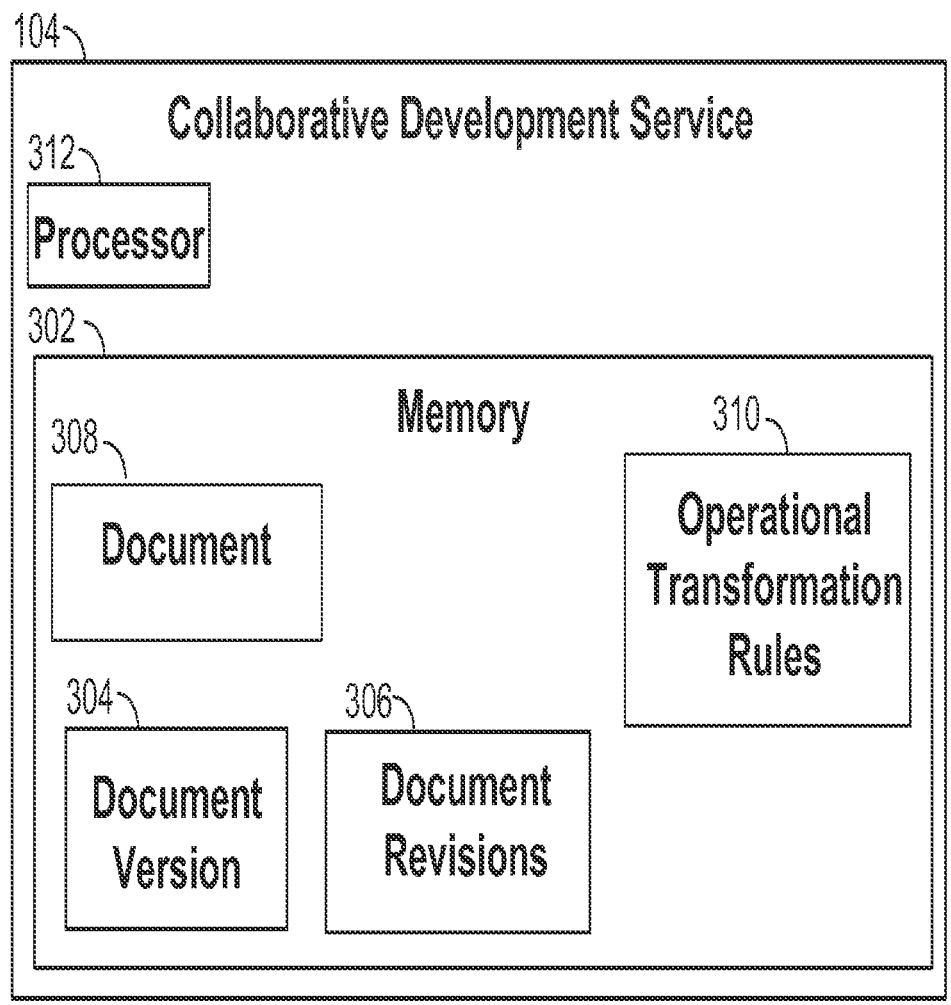
FIG. 3 shows functional components of an exemplary collaborative development service in accordance with an embodiment.

FIG. 3 shows functional components of collaborative development service 104 in accordance with an embodiment. Collaborative development service 104 includes a processor 312 and a memory 302. Collaborative development service 104 may include other components not shown in FIG. 3. Memory 302 stores documents, such as document 308, and a set of operational transformation rules 310. In an alternative embodiment, document 308 and operational transformation rules 310 may be stored external to memory 302 and collaborative development service 104. In one embodiment, a set of operational transformation rules 310 is stored on collaborative development service 104 and is not within user device 106-A. In one embodiment, operational transformation rules 310 stored on collaborative development service 104 are identical or substantially similar to operational transformation rules 230 stored on user device 106-B.

In one embodiment, collaborative development service 104 dynamically determines whether or not to apply operational transformation rules 310 to editing changes received from user devices. When a user employing user device 106-A accesses document 308. collaborative development service 304 determines that user device 106-A does not have operational transformation capability, and therefore, that operational transformation rules 310 must be applied to changes to document 308 (when appropriate) by collaborative development service 104 prior to sending the changes to user device 106-A. When a user employing user device 106-B accesses document 308. collaborative development service 104 determines that user device 106-B does store a version of operational transformation rules 230 and that therefore changes received from user devices may be sent by collaborative development service 104 to user device 106-B without applying operational transformation rules 310. In this embodiment user device 106-B can apply operational transformation rules locally to the editing changes.

Figure 4A:
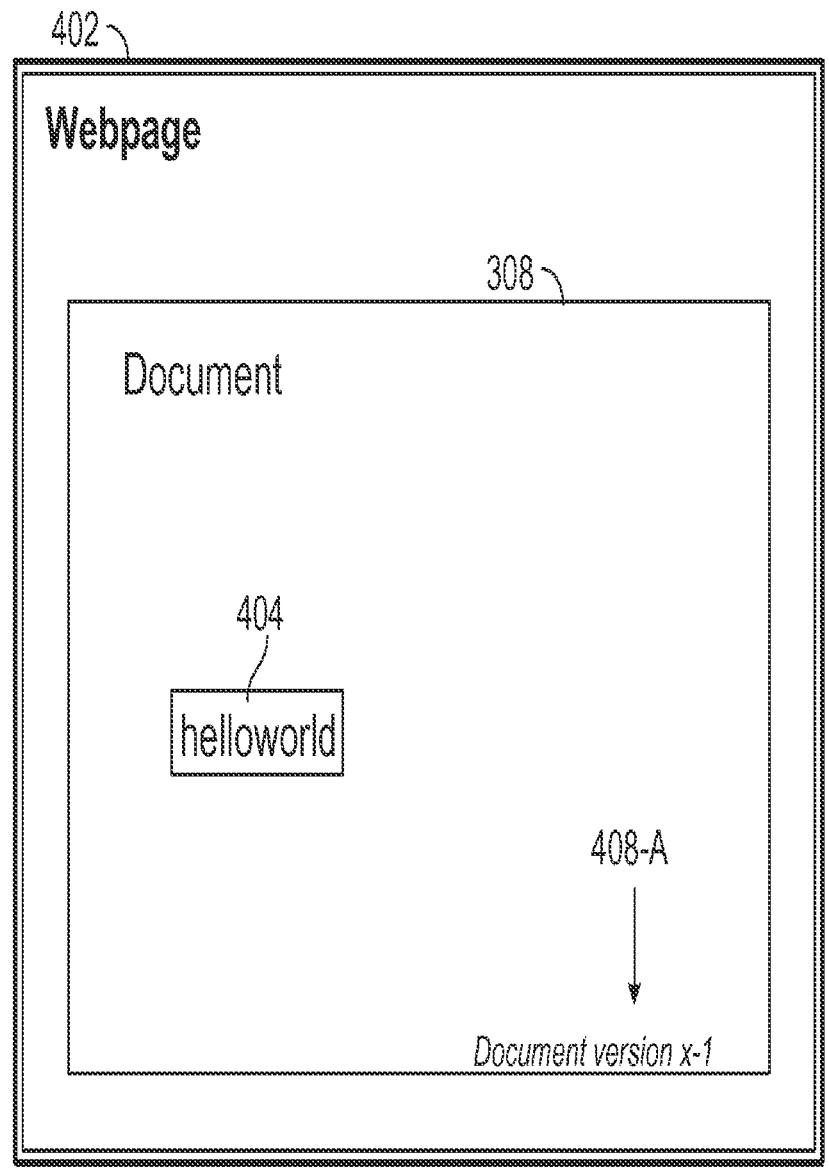
FIG. 4A shows a first version of a document displayed on a webpage in accordance with an embodiment.

FIG. 4A shows a first version of document 308 displayed on webpage 402 in accordance with an embodiment. Webpage 402 is a part of website 108 and can be accessed by users of mobile device 106-A. In the illustrative embodiment shown by FIG. 4, a document version (x−1) 408-A is shown. Document version 408-A is shown for exemplary purposes only and may be invisible to users of mobile device 106-A. In the illustrative embodiment, suppose that the current document 308 version is version "x." Therefore, document version (x−1) 408-A depicted in FIG. 4A indicates that displayed version of document 308 is not the current version, but is an older or previous version.

Document 308 includes a word "helloworld" 404. In one embodiment, the word "helloworld" 404 may have been input into document 308 by one or more users employing end user devices 106-A and 106-B. For example, the users may have sent instructions to collaborative development service 104 to input "helloworld" 404 within document 308.

Figure 4B:
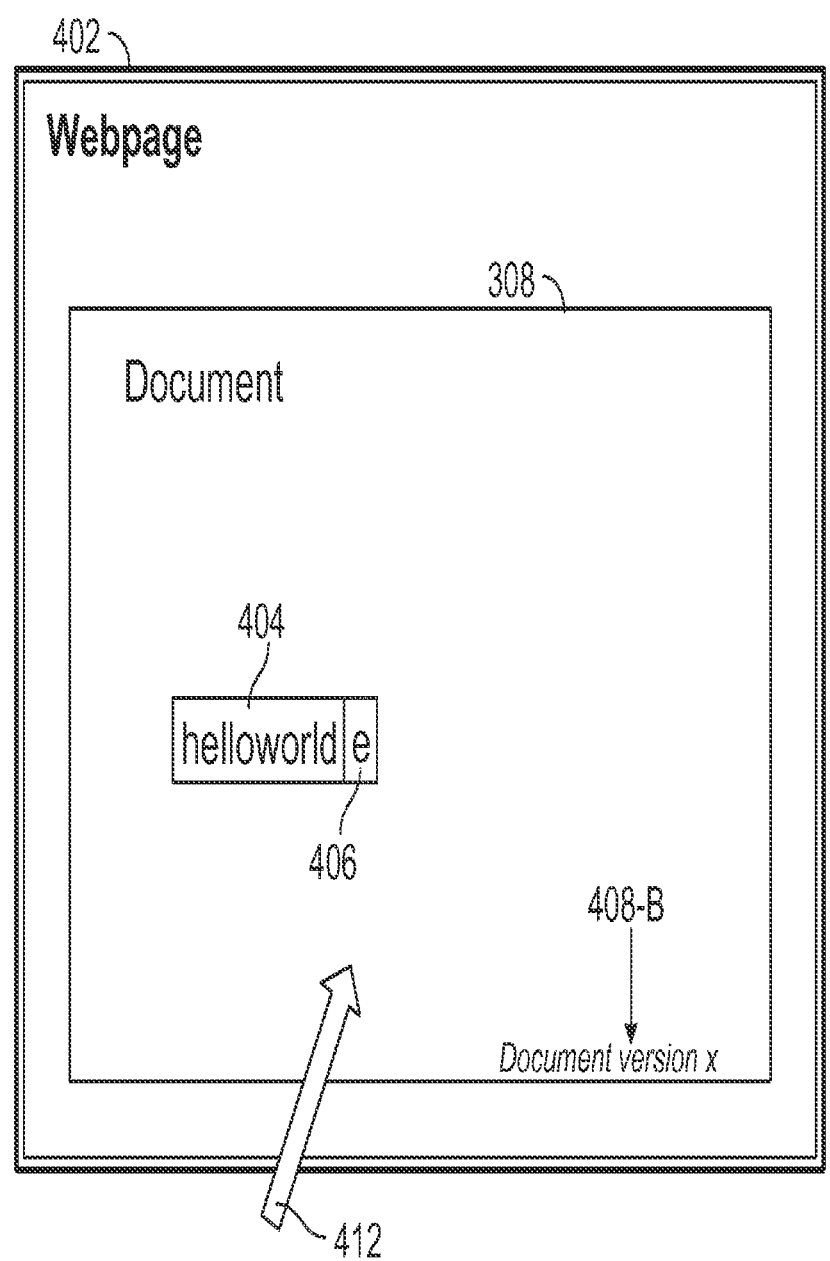
FIG. 4B shows a second version of a document displayed on a webpage in accordance with an embodiment.

FIG. 4B shows a second version of document 308 displayed on webpage 402 in accordance with an embodiment. An indicator of the document version (x) 408-B is shown, indicating that the current version is shown. One or more mutations and/or changes may have occurred between document version 408-A and document version 408-B. In the illustrative embodiment, a user employing user device 106-B sent instructions, indicated by arrow 412, to collaborative development service 104 to append the letter "e" 406 to the word "helloworld" 404 resulting in the current version of the document (e.g. version x). In one embodiment, the user may have sent the instructions, indicated by arrow 412, to collaborative development service 104. In one embodiment, these instructions may be sent using interframe communication. Details of interframe communication are described in U.S. patent application Ser. No. 13/224,479 filed Sep. 2, 2011, which is hereby incorporated by reference herein in its entirety.

Figure 4C:
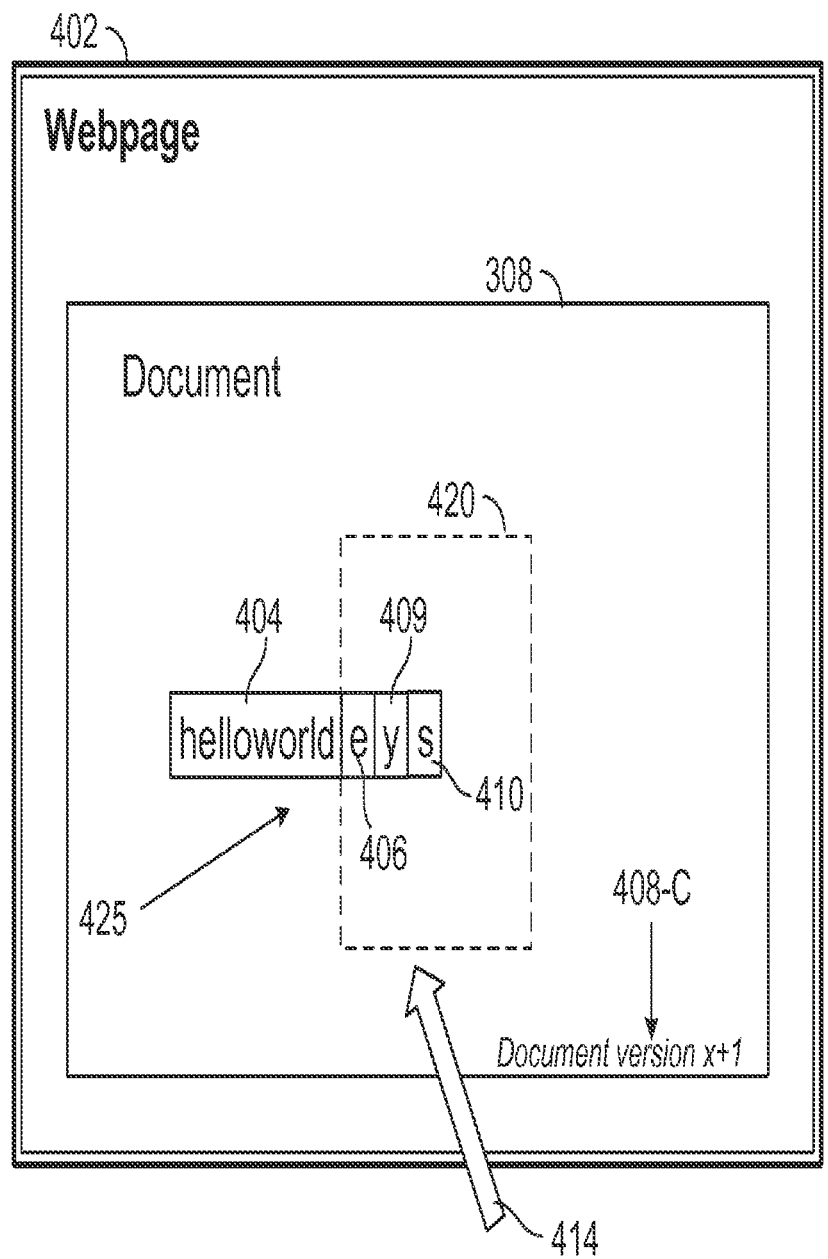
FIG. 4C shows a third version of a document displayed on a webpage in accordance with an embodiment.

FIG. 4C shows a third version of document 308 displayed on webpage 402 in accordance with an embodiment. In the illustrative embodiment, a user employing user device 106-A sends instructions, indicated by arrow 414, to append the letters "y" as a first change 409 and "s" as a second change 410 at the end of the word. For example, a user employing user device 106-A may send the instructions, indicated by arrow 414, to collaborative development service 104 using interframe communication. Collaborative development service 104 then applies an operational transformation rule to the changes to generate a transformed change 425.

According to an embodiment, a user employing uses device 106-A may send textual or non textual elements or edits to be applied to document 308. For example, a user may send instructions to input spreadsheet elements, chart elements, drawing elements, a photograph or image elements, chart elements, table elements, video elements, etc.

Figure 5:
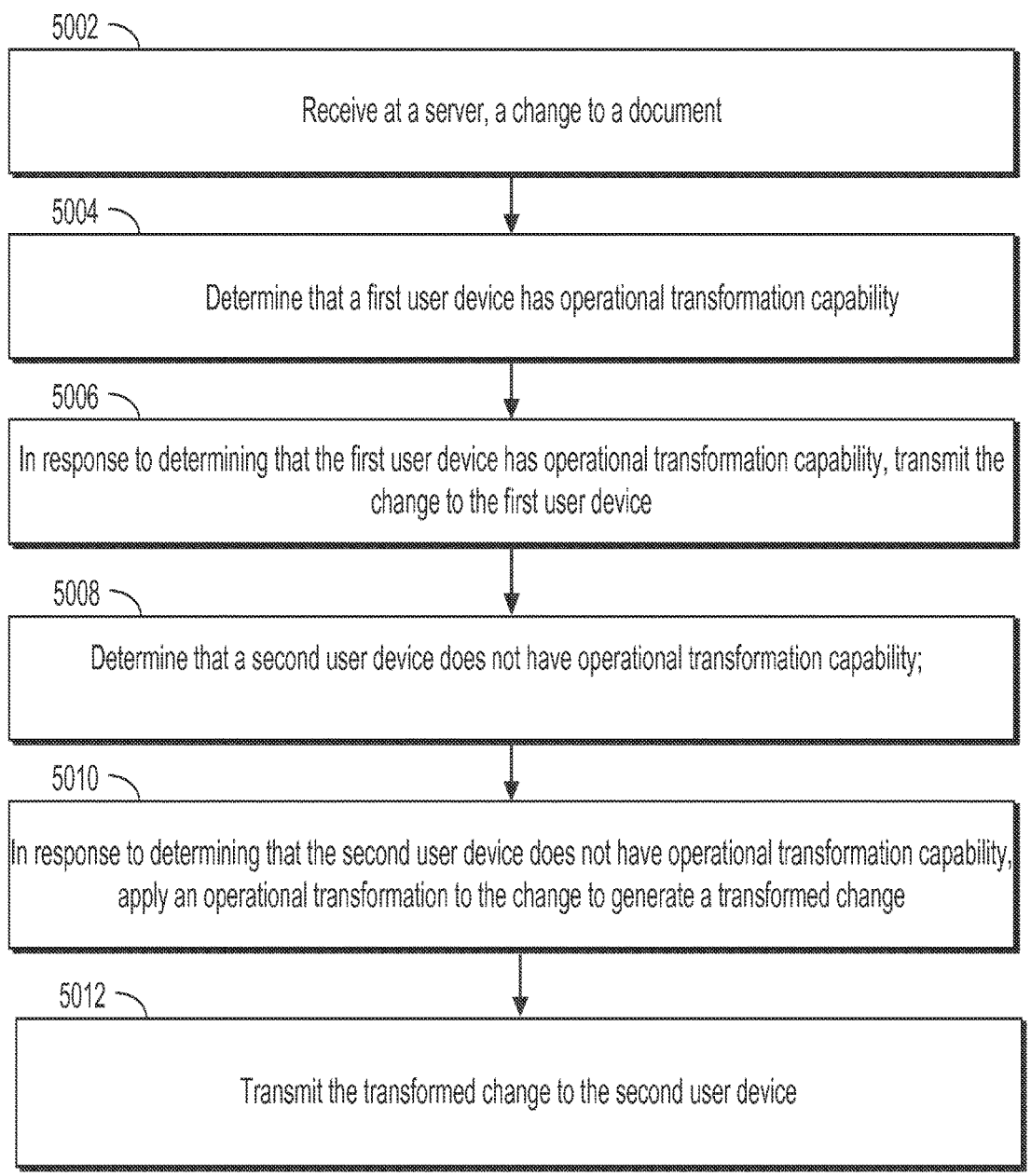

FIG. 5 is a flowchart of a method of providing collaborative document editing services in accordance with an embodiment. At step 5002, a change to a document is received at a server. Collaborative development service 104 receives a first change to document 308, via network 102. In the illustrative embodiment in FIG. 4C, collaborative development service 104 receives, from a user employing user device 106-A. instructions indicated by arrow 414, comprising the change, to append the letters "y" as change 409 at the end of the word "helloworld" 404. In one embodiment, the change to the document originates at user device 106-A.

At step 5004, it is determined that a first user device has operational transformation capability. For example, collaborative development service 104 may determine whether a device has operational transformation capability based on a message or other information received from the device. Alternatively, collaborative development service 104 may maintain a table or database indicating which user devices have operational transformation capability and which user devices do not. In the illustrative embodiment, collaborative development service 104 determines that user device 106-B has stored operational transformation rules and therefore that user device 106-B has operational transformation capability.

At step 5006, in response to determining that the first user device has operational transformation capability, the change is transmitted to the first user device, Collaborative development service 104 transmits the change (e.g. to append the letters "y" as change 409 at the end of the word "helloworld" 404) user device 106-B. User device 106-B applies operational transformations to the change locally, as necessary.

At step 5008, it is determined that a second user device does not have operational transformation capability. Collaborative development service 104 determines that user device 106-A does not have operational transformation capability, since user device 106-A does not store a copy of operational transformation rules 230.

At step 5010, in response to determining that the second user device does not have operational transformation capability, an operational transformation rule is applied to the change to generate a transformed change. Collaborative development service 104 applies an operational transformation rule 310 to generate a transformed change 425, shown in FIG. 4C.

At step 5012, the transformed change is transmitted to the second user device. Collaborative development service 104 transmits transformed change 425 to user device 106-A via network 102.

In accordance with an embodiment, a user device such as a mobile user device 106-A that does not have operational transformation capability provides a user interface that allows collaborative editing and synchronization with collaborative development service 104.

Suppose now that two people, Larry and Petal, are collaborating on writing a poem together. Petal is employing user device 106-A and Larry is employing user device 106-B to access document 308 to write their poem. As discussed above, user device 106-A does not locally store a set of operational transformation rules, and can collaboratively edit document 308 by accessing website 108 via network 102.

In one embodiment, user device 106-B automatically sends requests for document 308 to collaborative development service 104. In another embodiment, user device 106-A periodically, or manually sends requests for document 308 to collaborative development service 104.

In one embodiment, instead of sending multiple requests to collaborative development service 104 to apply changes to document 308, multiple requests are batched in order to minimize the number of requests. In one embodiment, user device 106-A batches requests together and sends them to collaborative development service 104 in the form of a single batch request. In one embodiment, the request is an Extensible Markup Language (XML) Hypertext Transfer Protocol (HTTP) request or "XHR." Thus, multiple requests may be batched together by user device 106-A and sent to collaborative development service 104 as a single XHR. Referring to FIG. 3, all requests may be stored in a document revision 306 located in memory 302 of collaborative development service 104.

Each request or batch request is uniquely identified by a session identification (SID) and request identification (RID) pair. The RID is incremented by user device 106-A after a response is received from collaborative development service 104. In one embodiment, if the request or response is interrupted (e.g. by network slowdown, disconnection, etc.) while in progress, RID will not be incremented. Collaborative development service 104 may use the RID and SID together to identify if user device 106-A is resending a previously received request. If the request has already been received and changes to document 308 have already been applied, collaborative development service 104 can safely ignore the previously received request. Thus, collaborative development service 104 provides deduplication. Collaborative development service 104 stores the most recent RID for each SID. This information can be stored within collaborative development service 104 or at a remote location.

As described above, a batch request may contain multiple requests. In one embodiment, the SID and RID is the same for all requests in the same batch. Therefore, the SID and RID are passed on to collaborative development set-vice 104 as part of the Uniform Resource Locator (URL) for the XHR and do not need to be sent as a pan of each request, if the requests are batched.

In one embodiment, instead of waiting to receive an entire XHR, which may contained multiple requests batched together, collaborative development service 104 processes responses to requests as they arrive.

Synchronization

Figure 6:
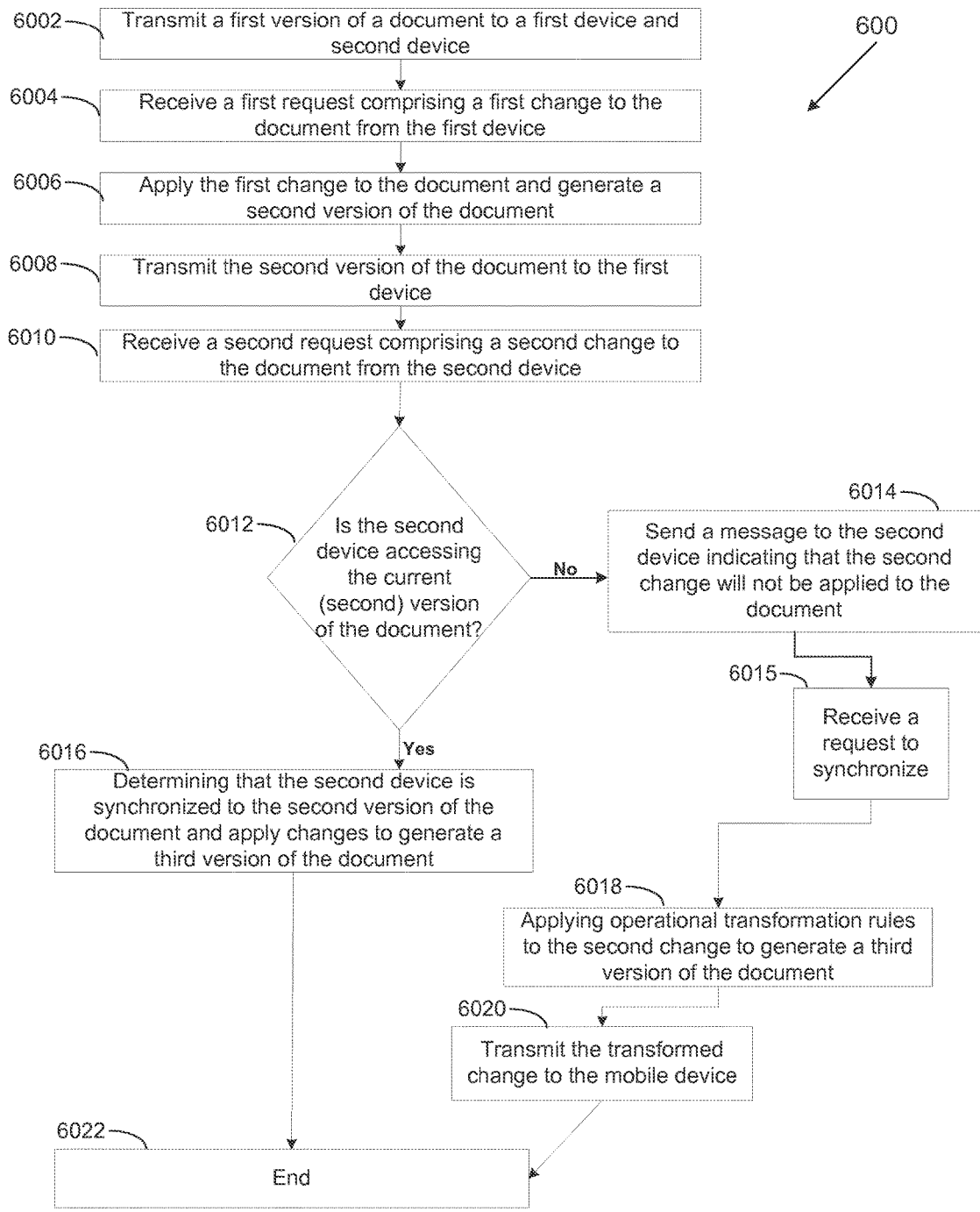
FIG. 6 is a flowchart depicting a method of providing collaborative document, editing services in accordance, with an embodiment.

When interacting with a user device that does not have operational transformation capability, collaborative development service 104 selectively applies operational transformation rules and applies changes to document 308. FIG. 6 is a flowchart of a method of providing collaborative development services in accordance with an embodiment. The steps of FIG. 6 will be described herein by referencing FIGS. 4A, 48 and 4C. FIG. 6 shows block diagram 600 for applying changes to a synchronized document m accordance with an embodiment. At step 6002, a first version of a document is transmitted to a first device and second device. Collaborative development service 104 transmits, via network 102 to user devices 106-A and 106-B, a first document version 408-A of document 308. Suppose that Petal and Larry receive on their respective devices 106-A and 106-B first document version 408-A of document 308, shown in FIG. 4A.

At step 6004, a first request comprising a first change to the document is received from the first device. Collaborative development service 104 receives a first set of instructions, indicated by arrow 412, to append the letter "e" to "helloworld" 404 from user device 106-B via network 102. Suppose that Larry has decided to edit document 308 by appending the letter "e." Larry, using user device 106-B, sends a first set of instructions 412 to collaborative development service 104 to edit document 308. The instructions may be communicated via interframe communication.

At step 6006, the first change to the document is applied and a second version of the document is generated. Collaborative development service 104 applies the first change to document 308 and generates a second document version 408-B of document 308. At this point, if operational transformation rules arc required, these rules are applied to the document by collaborative development service 104 and/or by user device 106-B.

At step 6008, the second version of the document is transmitted to the first device. Collaborative development service 104 transmits the second, updated document version "x" 408-B of document 308, as depicted in FIG. 4B, to user device 106-B via network 102. In one embodiment, Larry receives the second version of document 308.

At step 6010, a second request comprising a second change to the document is received from the second device. Collaborative development service 104 receives the second request comprising the second change to document 308 from device 106-A. Suppose that Petal now wishes to append the letters "y" and "s" to the document after "helloworld" 404. At this point, Petal is still accessing the older document version (x−1) 408-A of document 308. Petal sends a request to collaborative development service 104 to append "y" 409 and "s" 410. In one embodiment, along with Petal's request, the document version of document 308 that Petal is accessing is sent to collaborative development service 104.

At step 6012, it is determined whether the second device is accessing the current (second) version of the document. Collaborative development service 104 determines, for example, by comparing the document version sent by user device 106-A to the latest stored document version 304, whether second device 106-A is accessing the current document version 408-B of document 308.

If the second device is not accessing the current version of the document, a message is sent to the second device indicating that the second change will not be applied to the document, as in step 6014. Collaborative development service 104 determines that user device 106-A is not accessing the current document version 408-B of document 308 and sends a message to user device 106-A that the second change will not be applied to document 308. At step 6015, a request to synchronize is received. Collaborative development service 104 receives a request to synchronize from user device 106-A. Collaborative development service 104 may also receive a bit set indicating a guarantee that user device 106-A's screen has been locked. In one embodiment, Petal attempts to transmit her changes to document 308 to collaborative development service 104. However, as she is using previous document version 408-A of document 308, she receives a message back from collaborative development service 104 that her changes will not be applied. Petal may then request to synchronize to document 308.

In the illustrative embodiment, after step 6014, synchronization is performed after receiving a request to synchronize and if a request for synchronization is not made, changes cannot be applied. For example, if Petal does not synchronize her device 106-A to the current and/or latest version of document 308, her changes cannot be applied. However, in one embodiment, her changes are saved locally on user device 106-A.

At step 6018, operational transformation rules are applied to the second change to generate a third version of the document. Collaborative development service 104 applies operational transformation rules to the second change, which was received from user device 106-A. Collaborative development service 104 then generates a third document version 408-C of document 308, as depicted in FIG. 4C.

At step 6020, the transformed change is transmitted to the mobile device. Collaborative development service 104 transmits the transformed change (and a third document version 408-C of document 308) to user device 106-A via network 102. Referring to FIG. 4C, user device 106-A then redraws an affected portion 420 of document 308 and updates the document version.

Referring back to the step 6012, if the second device is accessing the current version, of the document, at step 6016, it is determined that the second device is synchronized to the second version of the document and changes; are applied to generate a third version of the document. Collaborative development service 104 determines that user device 106-A is synchronized and is accessing the latest document version 408-C of document 308. For example, collaborative development service 104 may receive a request from user device 106-A to synchronize to the latest document version. In response to the request, collaborative development service 104 may transmit the latest version (third version) of document 308 to user device 106-A. In one embodiment, while synchronization to third version 408-C of document 308 is being performed, user device 106-A locks document 308 so that no additional changes are made. In one embodiment, collaborative development service 104 may require an acknowledgement receipt from user device 106-A to ensure that the latest version of the document was received and synchronization was performed properly. In one embodiment, a bit set indicating a guarantee that user device 106-A's screen has been locked accompanies the request received at collaborative development service 104. The flowchart or routine then ends at step 6022.

Optimistic Save

In one embodiment, an optimistic save feature is provided to the user device that does not have operational transformation capability to facilitate collaborative editing. In one embodiment, optimistic save is provided at all times, unless a previous optimistic save has failed at the user device. In one embodiment, optimistic save may automatically save any changes made by a user of user device 106-A to document 308, and collaborative development service 104 can process the changes made via optimistic save, as long as no other collaborators transmit changes. In one embodiment, changes saved by optimistic save may be saved periodically and sent to collaborative development service 104.

Referring to the above example, suppose now that Petal wishes to complete the poem without input from Larry. However, Petal tells Larry that he can continue to view document 308 without making any changes. Any changes made by Petal to document 308 are saved optimistically as long as no other collaborator (e.g. Larry) makes changes. In one embodiment, changes made by Petal are saved in real-time.

User Viewing Only

In one embodiment. Larry may view changes made to document 308 via user device 106-B. Periodically, (e.g. by polling every 5 seconds, etc.) user device 106-B will ask collaborative development service 104 to provide an updated version of document 308. As Larry is not making any modifications to document 308, operational transformation rules do not need to be applied. Therefore, collaborative development service 304 transmits the most updated versions of document 308 to user device 106-B periodically. In one embodiment, a user can specify how often polling is to be performed. In another embodiment, polling time is predetermined. In yet another embodiment, a first user can view changes made to document 308 by a second user substantially in real-time as long as the first user is not making any changes to document 308.

Two Collaborators Sending Instructions to Edit Document at the Same Time

Suppose that two users forward instructions to collaborative development service 104 to apply changes to document 308 substantially at the same time. Collaborative development service 104 addresses only one request or XHR containing instructions at one time. The request being addressed is referred herein to as the active request. In this way, collaborative development service 104 buffers any changes that occur while the request is active and after changes contained in the active request have been applied, changes contained in the next buffered request can be addressed. Collaborative development service 104 receives the instructions and places them in a buffer. Collaborative development service 104 then applies the first received instruction to document 308 and after the instruction has been applied to document 308, the next sequentially buffered instruction is applied to document 308. Operational transformation rules are applied to these instructions and transformed changes are generated and provided to user device 106-A. User device 106-A redraws document 308 based on the transformed changes.

Force Save

Suppose user device 106-A wishes to make a change to first document version 408-A. However, user device 106-B has already sent a XHR or sends at the same time as user device 106-A sends a request. Collaborative development service 104 determines that user device 106-A is accessing an older document version 408-A and not the current document version 408-B. As the document versions do not match, collaborative development service 104 sends an error message to user device 106-A indicating that the changes will not be applied to document 308 until a force save (or manual save) command is performed. After a force save has been initiated, mobile device 106-A locks the screen and no further changes can be made to document 308 by the user of user device 106-A until the operational transformation rules are applied to the changes to generate a transformed change, and user device 106-A redraws an affected portion 460 of document 308 and a new document version 408-C is created. These steps are discussed in detail below with respect to FIG. 7.

Figure 7:
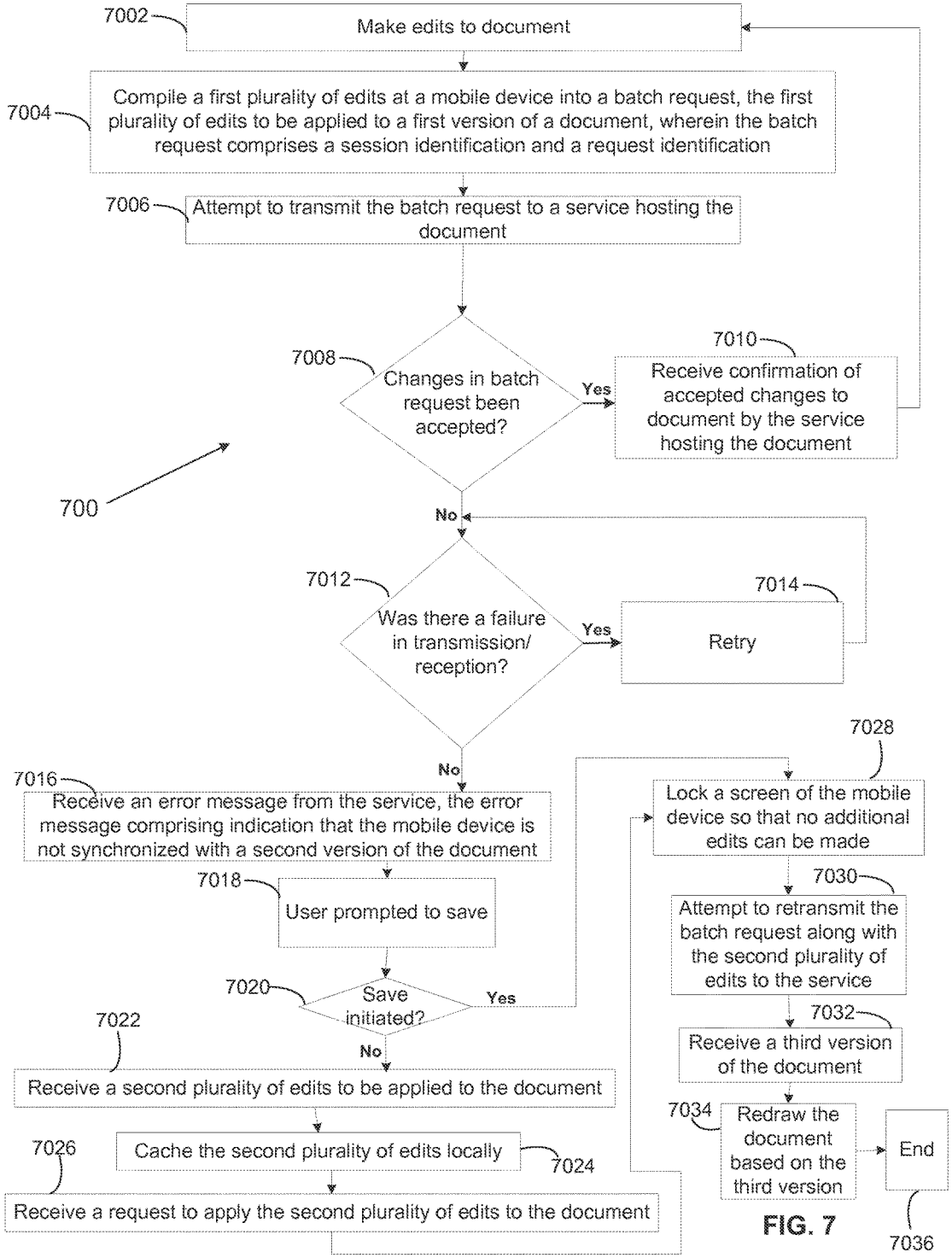
FIG. 7 in flowchart depicting a method of providing collaborative document editing services in accordance with an embodiment.

FIG. 7 is a flowchart of a method of providing collaborative development services in accordance with an embodiment. The steps 700 shown in FIG. 7 may be performed by user device 106-A. According to the illustrative embodiment in FIG. 7, at step 7002, edits are made to a document. A user employing user device 106-A may make edits to document 308. Suppose that Petal wishes to make edits to document 308.

At step 7004, a first plurality of edits are compiled at a mobile device into a batch request. The first plurality of edits are to be applied to a first version of a document, wherein the batch request comprises a session identification and a request identification. User device 106-A compiles a first plurality of edits 409 and 410 into a batch request. The first plurality of edits are to be applied to a first version 408-A of document 308. The batch request comprises a session identification (SID) and a request identification (RID) pair, as described in the above. Accordingly, Petal's edits are compiled into a batch request.

At step 7006, an attempt to transmit the batch request to a service hosting the document is made. User device 106-A attempts to send the batch request to collaborative development service 104 via network 102. User device 106-A may transmit, along with the batch request, an indication of a document version that user device 106-A is accessing. An optimistic save may have been used to save the changes in the batch request.

At step 7008, it is determined whether changes contained in the batch request have been accepted. In one embodiment, user device 106-A determines that changes have been accepted if collaborative development service 104 returns transformed changes back to user device 106-A, in a manner as described above. Thus, if it is determined that changes contained in the batch request have been accepted, at step 7010, a confirmation of accepted changes to document is received. The confirmation of accepted changes to document 308, sent by the service hosting the document (i.e. collaborative development service 104) is received by user device 106-A. The routine or flowchart then returns back to step 7002.

At step 7012, it may be determined (optionally) whether there was a failure in transmission or reception of the batch request. User device 106-A determines whether there was a failure in transmission or receipt of the batch request. A timer may be set to ensure that enough time has passed before determining a failure has occurred. If it is determined that changes contained in the batch request have not been accepted due to a failure, the batch request is resent. Thus, at step 7014, user device 106-A retries to send the batch request. The flowchart loops back from step 7014 to 7012 until is it determined that no failure in transmission or reception occurred. In one embodiment, in case collaborative development service 104 does not receive the batch request due to a failure (e.g. failure due to network problems, network disconnection, time out, server error response, etc.), a failure in reception occurs.

At step 7016, an error message is received from the service; the error message comprises indication that the mobile device is not synchronized with a second version of the document. User device 106-A receives an error message indicating that it is not synchronized with a second version 408-B of document 308. Therefore, changes made in the batch request will not be applied to document 308. User device 106-a may provide the error message to a user. Suppose that Petal is using device 106-A. Petal then receives the error message and is prompted to save her changes to document 308. In one embodiment, a save button or icon may be highlighted or otherwise made prominent to Petal so that she realizes that her changes will not go into affect until she hits the save button.

At step 7018, the user is prompted to save. User device 106-A prompts the user to save using the force save method described above.

At step 7020, it is determined whether save was initiated. User device 106-A determines whether save was initiated. If a save is initiated, the routine or flowchart continues onto step 7028 (described below). In accordance with an embodiment, user device 106-A attempts to send the change (e.g. in a batch request) to collaborative development service 104 and user device 106-A's screen is locked so that no additional edits can be made. The routine or flowchart then continues to steps 7030, 7032, 7034 and 7036 and will be described below.

On the other hand, if at step 7020, save is not initiated, the routine or flowchart continues on to step 7022. At step 7022, a second plurality of edits to be applied to the document ate received. User device 106-A receives a second plurality of edits (e.g. 410), from a local user employing user device 106-A, via input/output 260, to be applied to document 308. Thus, the local user is allowed to continue, editing. In one embodiment, should Petal not hit the save button, she may continue to make further edits to document 308. However, no requests for changes to document 308 will be sent to collaborative development service until Petal hits the save button.

At step 7024, the second plurality of edits are cached locally. User device 106-A locally caches the plurality of edits (e.g. in memory 240).

At step 7026, a request is received to apply the second plurality of edits to the document. User device 106-A receives a request to apply the second plurality of edits to document 308. Suppose that Petal is satisfied with her changes to document 308 and hits the save button. Petal's request to apply the edits to document 308 is received by user device 106-A.

At step 7028, a screen of the mobile device is locked so that no additional edits can be made. A screen of mobile device 106-A is locked so no additional edits can be made. Suppose that Petal's mobile device screen locks and no further changes can be made. Petal may be provided with a message indicating that no further changes can be made until the current changes are applied to document 308, At step 7030, an attempt is made to retransmit the batch request along with the second plurality of edits to the service. User device 106-A attempts to retransmit the batch request along with the second plurality of edits to collaborative development service 104. in an embodiment, an attempt is made to batch Petal's changes into a XHR and an attempt is made to send the XHR to collaborative development service 104. If the XHR fails to .reach collaborative development service 104 (e.g. failure due to network problems, network disconnection, time out, server error response, etc.), the XHR is resent until it reaches collaborative development service 104.

At step 7032, a third version of the document is received. User device 106-A receives the third version 408-C of document 308 via network 102. Such a document version may contain transformed changes after collaborative development service 104 has applied operational transformation rules to the batch request. After successfully receiving the XHR, collaborative development, service 104 applies the changes contained within XHR, applies operational transformation rules to generate a transformed change and returns the transformed change along with a new version number of document 308 to Petal's device 106-A.

At step 7034, the document is redrawn based on the third version. User device 106-A redraws document 308 or an affected portion 420 of document 308 based on the third version 408-C of the document, in a manner described above. User device 106-A then provides the redrawn document to a user. The routine or flowchart may then end at step 7036.

In one embodiment, the screen of mobile device 106-A is unlocked in response to redrawing the document.

In one embodiment, a XHR may contain one of the following; a metatdata request, a plurality of optimistic save requests or a force save request. In one embodiment a XHR may only comprise one of the above requests. Further, a XHR may contain only mutation requests (e.g. force-save request or optimistic save request) or only metadata requests. Additionally, an XHR may contain a refresh type, which is used to poll collaborative development service 104 for incoming changes when no local changes have been made.

Collaborative development service 104 may create a list of rejected changes (e.g. as a result of optimistic save). A rejected mutations list (RML) results when changes or mutations that are optimistically saved are rejected. In one embodiment, a failed mutation request list (FMRL) is a result of XHR failure (e.g. failure due to network problems, network disconnection, time out, server error response, etc.). Examples of how these lists are used are described below.

Save

In order to perform either an optimistic save or a force save command, it is determined if collaborative development service 104 contains pending requests in a mutation list or if the RML is not empty. It is also determined that FMRL does not contain a force save request. If no XHRs are in progress, either optimistic save or force save command can be called.

In one embodiment, if FML is empty, then optimistic save, command can be called. Otherwise, force save command can be called.

Retry Failed Requests

In order to retry failed requests, the following conditions must be met. One or more failed request must exist, however no new changes or rejected changes (or mutations) (e.g., from a rejected optimistic save request) can exist. Additionally, the mutation list must be empty, the RML must be empty, the FMRL must not be empty and all requests in the FMRL must be of the same type. That is, multiple types of requests may not be made. Additionally, no XHRs can be in progress.

Figure 8:
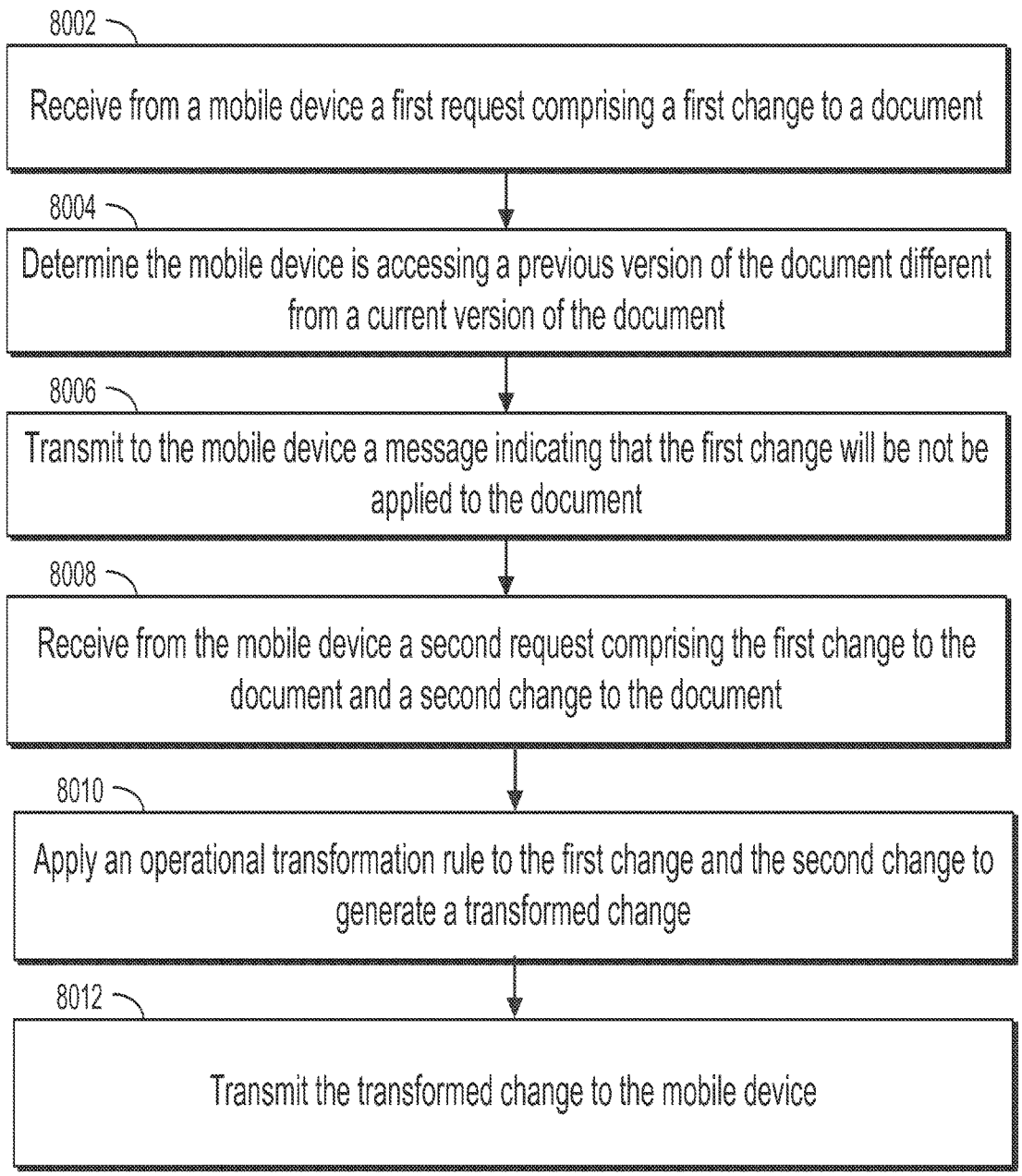
FIG. 8 is a flowchart depicting a method of providing collaborative document editing services in accordance with an embodiment.

In one embodiment, two users may access document 308 at the same time, where one of the two users employs a mobile device that does not have operational transformation capability. FIG. 8 is a flowchart depicting a method of providing collaborative document editing services in accordance with an embodiment. The steps of FIG. 8 will be described herein by referencing FIGS. 4A, 4B and 4C. At step 8002, a first request comprising a first change to a document is received from a mobile device. The request for document 308 may be received at collaborative development service 104 from user device 106-A via network 102. In one embodiment, suppose that a user employing user device 106-A is viewing a previous version of document 308, as illustratively depicted by FIG. 4A. In this embodiment, user device 106-A has not received the current version of document 308. Therefore, the user is viewing the previous document version 408-A "Document version x−1" displayed to the user on webpage 402, as depicted by FIG. 4A. Suppose now that the user wishes to add the letter "x" at the end of the word "helloworld" 404 to the previous document version. User device 106-A sends a first request comprising a first change to document 308 to collaborative development service 104.

At step 8004, it is determined that the mobile device is accessing a previous version of the document different from a current version of the document. Referring to FIG. 3, collaborative development service 104 has stored the latest or up to the latest version of document 308 in document version 304 in memory 302. Along with the first request sent from user device 106-A, user device 106-A transmits an indication of the version of document 308 that is currently stored on user device 106-A. Collaborative development service 104 can make the determination that user device 106-A is accessing a previous version of document 308 based on the disparity between the indication received from user device 106-A and the current version of document 308 stored in document version 304 in memory 302. Collaborative development service 104 may determine that the mobile device is accessing a previous version of document 308 different from a current version of document 308 by other means. Suppose that the user is accessing previous document version 408-A, and sends requests to make edits to document 308 along with an indication that she is accessing document version 408-A to collaborative development service 104. Collaborative development service 104 determines that the user is not accessing the current version of document 308. According to the illustrative embodiment, the user is accessing previous document version 408-A "x−1" in FIG. 4A, however, the current version 408-B "x" of document 308 is the latest version. For example, suppose that a second user has appended letter "e" 406 to "helloworld" 404, as depicted in FIG. 4B. The second user may have sent instructions in. the term of a request 412, to collaborative development service 104 via 412 to append letter "e" 406 after "helloworld" 404. In one embodiment, the instructions are sent to collaborative development service 104 via interframe communication. After collaborative development service 104 verities that user device 106-B is not accessing a previous version of document 308, the changes are made and the document version is incremented (e.g. numerically incremented by "1"). Document 308 is updated to include the second user's change and "document version x" 408-B is created. Document version 408-B "x" is sent to user device 106-B.

At step 8006, a message indicating that the first change will be not be applied to the document is transmitted to the mobile device. Collaborative development service 104 transmits a message indicating that the first change will not be applied to document 308 to mobile device 106-A via network 102. As collaborative development service 104 has made a determination that the version of document 308 accessed by user device 106-A is not the current version and thus, user device 106-A is not synchronized to the current version of document 308, collaborative development service 104 sends a message to user device 106-A. In one embodiment, in response to receiving the message, user device 106-A sends an alert or error message to the user employing user device 106-A. Thus, according to an embodiment, after sending instructions to add the letter "x" at the end "helloworld" 404, the user receives an error message indicating that her device is not synchronized with collaborative development service 104 (and other user devices, 106-B, etc.) and therefore, the user's changes will not be applied to document 308.

At step 8008, a second request comprising the first change to the document and a second change to the document, is received from the mobile device. Collaborative development service 104 receives a second request comprising the first change to the document and a second change to the document from mobile device 106-A, via network 102. In one embodiment, collaborative development service 104 receives an indicator (e.g. a bit set) or a flag from user device 106-A that promises or guarantees that user device 106-A's screen is locked. The indicator may be received by collaborative development service 104 as a part of the second request (e.g. within the header or payload of the request) or alternatively, the indicator may be received independently of the second request. Suppose that the user is notified that user device 106-A is not synchronized to the latest version of document 308, as described above. According to an embodiment, after the user receives an error message and realizes that he/she is not accessing the current version of document 308 and that his/her edits will not be applied to document 308, the user continues to edit her poem. The user may decide to add the letter "s" at the end of the letter "y". When the user is satisfied with her changes, the user makes a selection on user device 106-A to upload her changes to document 308. User device 106-A then locks up document 308 so that no other changes are made while the first and second changes are being communicated to collaborative development service 104, then attempts to send a second request to collaborative development service 104 to include the users first and second changes (e.g. appending the letters "y" and "s") in document 308. For example, document 308 displayed on webpage 402 accessed by user device 106-A may change color (e.g. turn grey) or an icon or text may be displayed to the user indicating that the device has locked down document 308. In one embodiment, user device 106-A may verify with the user that no other changes are required before locking her device and transmitting the first and second changes to collaborative development service 104. Instructions including the first and second changes, 409 and 410, respectively, are received by collaborative development service 104 as indicated by arrow 414 in FIG. 4C. In one embodiment, these changes may be batched together to form a single request, in a manner described below. These instructions may be sent by user device 106-A via interframe communication, in a manner described above. Additionally, the instructions may include a bit set indicative of a guarantee that user device 106-A's screen has been locked. In one embodiment, a verification may be performed at user device 106-A prior to transmission of the bit set.

At step 8010, an operational transformation rule is applied to the first change and the second change to determine a transformed change. Collaborative development service 104 applies an operational transformation rule stored within the set of operational transformation rules 330 to first change "y" 409 and second change "s" 410.

At step 8012, the transformed change is transmitted to the mobile device. Collaborative development service 104 forwards to mobile device 106-A the transformed change via network 102. In one embodiment, when mobile device 106-A receives the transformed change, mobile device 106-A redraws the changes to document 308, as indicated by the transformed change. Mobile device 106-A redraws the changes to document 308 for display to a user. In one embodiment, mobile device 106-A does not need to store a local copy of the set of operational transformation rules but relies on collaborative development service 104 to perform the operational transformation rules, generate a transformed change and forward the transformed change to mobile device 106-A. In one embodiment the transformed change is transmitted to mobile device 106-A in a form of a list of operational transformations determined by the operational transformation rule.

In one embodiment, mobile device 106-A does not redraw the entire updated document but only redraws affected portion 420 of the document 308 that needs to be updated. Suppose now that the user has sent her changes to collaborative development service 104, as described above. The user will receive the transformed changes on mobile device 106-A which will redraw affected portion 420 of document 308.

In various embodiments, the method steps described herein, including the method steps described in FIGS. 5, 6, 7 and/or 8, may be perforated in an order different from the particular order described or shown. In other embodiments, other steps may be provided, or steps may be eliminated, from the described methods.

Systems, apparatus, and methods described herein may be implemented using digital circuitry, or using, one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client server relationship may be defined and controlled by computer programs running on the respective client and server computers.

Systems, apparatus, and methods described herein may be used within a network based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computers). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 5, 6, 7 and/or 8. Certain steps of the methods described herein, including one or more of the steps of FIGS. 5, 6, 7 and/or 8, may be performed by a server or by another processor in a network-based cloud-computing system. Certain steps of the methods described herein, including one or more of the steps of FIGS. 5, 6 and 7, may be performed by a client computer in a network-based cloud computing system. The steps of the methods described herein, including one or more of the steps of FIGS. 5, 6, 7 and/or 8, may be performed by a server and/or by a client computer in a network-based cloud computing system, in any combination.

Systems, apparatus, and methods described herein may be implemented using a computer program product tangibly embodied in an information carrier e.g., in a non-transitory machine-readable storage device, for execution by a programmable processor; and the method steps described herein, including one or more of the steps of FIGS. 5, 6, 7 and/or 8, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 9:
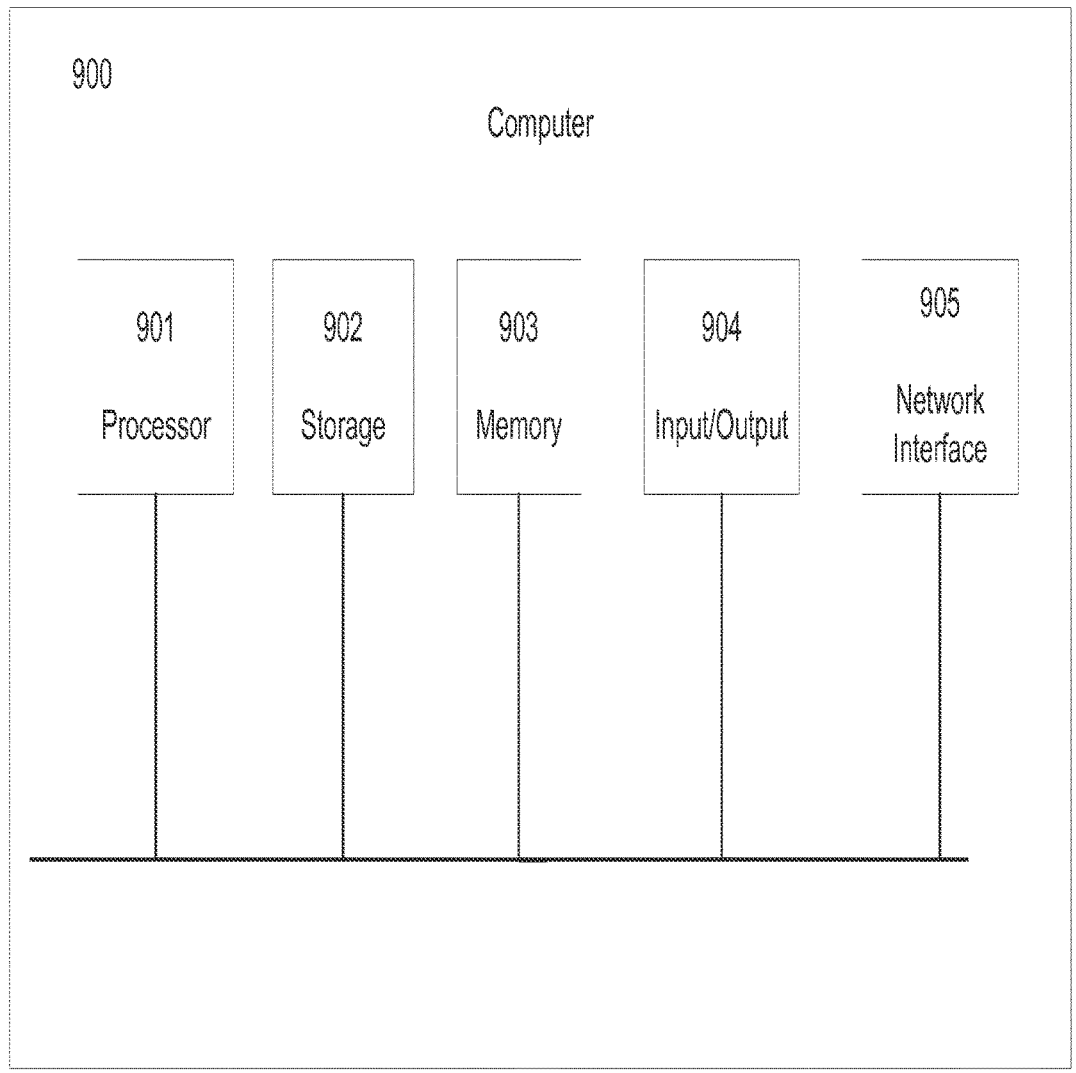
FIG. 9 shows components of a computer that may be used to implement the invention.

A high-level block diagram of an exemplary computer that may be used to implement systems, apparatus and methods described herein is illustrated in FIG. 9. Computer 900 includes a processor 901 operatively coupled to a data storage device 902 and a memory 903. Processor 901 controls the overall operation of computer 900 by executing computer program instructions that define such operations. The computer program instructions may be stored in data storage device 902, or other computer readable medium, and loaded into memory 903 when execution of the. computer program instructions is desired. Thus, the method steps of FIGS. 5, 6, 7 and/or 8 can be defined by the computer program instructions stored in memory 903 and/or data storage device 902 and controlled by the processor 901 executing the computer program instructions. For example, the computer program instructions can be implemented as computer executable code programmed by one skilled in the art to perform an algorithm defined by the method steps of FIGS. 5, 6, 7 and/or 8. Accordingly, by executing the computer program instructions, the processor 901 executes an algorithm defined by the method steps of FIGS. 5, 6, 7 and/or 8. Computer 900 also includes one or more network interfaces 904 for communicating with other devices via a network. Computer 900 also includes one or more input/output devices 905 that enable user interaction with computer 900 (e.g., display, keyboard, mouse, speakers, buttons, etc.).

Processor 903 may include both general and special purpose microprocessors, and may be the sole processor or one of multiple processors of computer 900. Processor 901 may include one or more central processing units (CPUs), for example. Processor 901, data storage device 902, and/or memory 903 may include, be supplemented by, or incorporated in one or more application-specific integrated circuits (ASICs) and/or one or more field programmable gate lists (FPGAs).

Data storage device 902 and memory 903 each include a tangible non-transitory computer readable storage medium. Data storage device 902, and memory 903, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read only memory (EEPROM), compact disc read-only memory (CD-ROM), digital versatile disc read-only memory (DVD-ROM) disks, or other non volatile solid state storage devices.

Input/output devices 905 may include peripherals, such as a printer, scanner, display screen, etc. For example, input/output devices 905 may include a display device such as a cathode ray tube (CRT) or liquid crystal display (LCD) monitor for displaying information to the user, a keyboard, and a pointing device such as a mouse or a trackball by which the user can provide input to computer 900.

Any or all of the systems and apparatus discussed herein, including server 104, user device 106, and components thereof, including web browser 210, display 270, processor 312, and memory 302, may be implemented using a computer such as computer 900.

One skilled in the art will recognize that an implementation of an actual computer or computer system may have other structures and may contain other components as well and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for providing document services, the method comprising:
   receiving, at a server, a change to a first version of a document during a collaborative editing of the document by a plurality of users comprising a first user of a first user device and a second user of a second user device, wherein the server locally stores a first set of operational transformation rules;
   determining that the first user device stores a second set of operational transformation rules;
   in response to determining that the first user device stores the second set of operational transformation rules, transmitting the change to the first user device to cause the first user device to present a second version of the document during the collaborative editing of the document, the second version of the document including the change;
   determining that the second user device does not store the second set of operational transformation rules and lacks capability to process the change to the document, wherein the second user device presents the first version that does not include the change, and the first user device presents the second version that includes the change during the collaborative editing;
   in response to determining that the second user device does not store the second set of operational transformation rules, applying one of the first set of operational transformation rules stored by the server to the change to generate a transformed change capable of being processed by the second user device; and
   transmitting the transformed change to the second user device to cause the second user device to apply the change to the first version of the document during the collaborative editing of the document.

2. The method of claim 1, further comprising:
   receiving, at the server, an automatic request for the document by the first user device.

3. The method of claim 1, wherein the change to the document originates at the first user device.

4. The method of claim 1, wherein the first set of operational transformation rules and the second set of operational transformation rules comprise a list of operational transformations.

5. The method of claim 1, wherein the change to the document is received at the server as a batched request.

6. The method of claim 5, wherein the batched request comprises an extensible markup language hypertext transfer protocol request.

7. The method of claim 6, wherein the extensible markup language hypertext transfer protocol request comprises one of:
   a force save request;
   one or more optimistic save requests; or
   a refresh type.

8. The method of claim 1, further comprising: transmitting the first version of the document along with transmitting the transformed change to the second user device.

9. The method of claim 1, wherein the second user device is a mobile user device.

10. The method of claim 1, wherein the change to the document is received through a website hosted by the server.

11. A non-transitory computer readable medium having program instructions stored thereon, the instructions capable of execution by a processor and cause the processor to:
    receive, at a server, a change to a first version of a document during a collaborative editing of the document by a plurality of users comprising a first user of a first user device and a second user of a second user device, wherein the server locally stores a first set of operational transformation rules;
    determine that a first user device stores a second set of operational transformation rules;
    in response to a determination that the first user device has operational transformation capability, transmit the change to the first user device to cause the first user device to present a second version of the document during the collaborative editing of the document, the second version of the document including the change;
    determine that a second user device does not store the second set of operational transformation rules and lacks capability to process the change to the document, wherein the second user device presents the first version that does not include the change, and the first user device presents the second version that includes the change during the collaborative editing;

in response to a determination that the second user device does not store the second set of operational transformation rules, apply one of the first set of operational transformation rules stored by the server to the change to generate a transformed change capable of being processed by the second user device; and transmit the transformed change to the second user device to cause the second user device to apply the change to the first version of the document during the collaborative editing of the document.

12. The non-transitory computer readable medium of claim 11, wherein the processor is further to:

receive, at the server, an automatic request for the document by the first user device.

13. The non-transitory computer readable medium of claim 11, wherein the change to the document originates at the first user device.

14. The non-transitory computer readable medium of claim 11, wherein the first set of operational transformation rules and the second set of operational transformation rules comprise a list of operational transformations.

15. The non-transitory computer readable medium of claim 11, wherein the change to the document is received at the server as a batched request.

16. The non-transitory computer readable medium of claim 15, wherein the batched request comprises an extensible markup language hypertext transfer protocol request.

17. The non-transitory computer readable medium of claim 14, wherein the extensible markup language hypertext transfer protocol request comprises one of:

a force save request;
one or more optimistic save requests;
or a refresh type.

18. The non-transitory computer readable medium of claim 11, wherein the processor is further to:

transmit the first version of the document along with transmitting the transformed change to the second user device.

19. The non-transitory computer readable medium of claim 11, wherein the change to the document is received through a website hosted by the server.

20. A system for providing document services, the system comprising:

a memory; and a processor coupled to the memory, the processor configured to:

receive a change to a first version of a document during a collaborative editing of the document by a plurality of users comprising a first user of a first user device and a second user of a second user device, wherein the memory locally stores a first set of operational transformation rules;

determine that a first user device stores a second set of operational transformation rules;

in response to a determination that the first user device has operational transformation capability, transmit the change to the first user device to cause the first user device to present a second version of the document during the collaborative editing of the document, the second version of the document including the change;

determine that a second user device does not store the second set of operational transformation rules and lacks capability to process the change to the document, wherein the second user device presents the first version that does not include the change, and the first user device presents the second version that includes the change during the collaborative editing;

in response to a determination that the second user device does not store the second set of operational transformation rules, apply one of the first set of operational transformation rules stored by the memory to the change to generate a transformed change capable of being processed by the second user device; and transmit the transformed change to the second user device to cause the second user device to apply the change to the first version of the document during the collaborative editing of the document.

* * * * *